United States Patent
Nishida

(10) Patent No.: US 9,652,186 B2
(45) Date of Patent: May 16, 2017

(54) APPARATUS AND SYSTEM FOR CONTROLLING OUTPUT OF DATA

(71) Applicant: Takayori Nishida, Tokyo (JP)

(72) Inventor: Takayori Nishida, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 56 days.

(21) Appl. No.: 13/970,801

(22) Filed: Aug. 20, 2013

(65) Prior Publication Data

US 2014/0055809 A1 Feb. 27, 2014

(30) Foreign Application Priority Data

Aug. 27, 2012 (JP) ................................ 2012-186236

(51) Int. Cl.
*G06F 3/12* (2006.01)

(52) U.S. Cl.
CPC .......... *G06F 3/1238* (2013.01); *G06F 3/1204* (2013.01); *G06F 3/1267* (2013.01); *G06F 3/1287* (2013.01); *G06F 3/1288* (2013.01); *G06F 3/1222* (2013.01); *G06F 3/1239* (2013.01)

(58) Field of Classification Search
CPC .... G06F 3/1238; G06F 3/1287; G06F 3/1288; G06F 3/1204; G06F 3/1267; G06F 3/1222; G06F 3/1239
USPC .................... 358/1.13, 1.14, 1.15
See application file for complete search history.

(56) References Cited

U.S. PATENT DOCUMENTS

| | | | | |
|---|---|---|---|---|
| 2003/0007819 A1* | 1/2003 | Wanda | .................. | G06F 3/1207 400/76 |
| 2004/0148335 A1* | 7/2004 | Keeney et al. | ............... | 709/201 |
| 2005/0179929 A1* | 8/2005 | Jain | .............................. | 358/1.14 |
| 2006/0044607 A1 | 3/2006 | Kato | | |
| 2011/0317215 A1* | 12/2011 | Ida et al. | ..................... | 358/1.15 |

FOREIGN PATENT DOCUMENTS

| | | |
|---|---|---|
| JP | 2006-099741 | 4/2006 |
| JP | 2009-064351 | 3/2009 |
| JP | 2009-066929 | 4/2009 |
| JP | 2010-100007 | 5/2010 |
| JP | 2011-198089 | 10/2011 |
| JP | 2011-243094 | 12/2011 |
| WO | WO 02/33531 A2 | 4/2002 |

OTHER PUBLICATIONS

Extended European search report dated Apr. 8, 2014.

* cited by examiner

*Primary Examiner* — Kent Yip
(74) *Attorney, Agent, or Firm* — IPUSA, PLLC

(57) ABSTRACT

An apparatus includes a data receiving part that receives output data from an information terminal; a data recording part that records the output data received by the data receiving part in a storage part in association with user information identifying a plurality of users; an information accepting part that accepts user information identifying a user; a first control part that controls output execution of output data included in the recorded output data that is associated with the user information accepted by the information accepting part; and a second control part that implements a control measure after the output data associated with the user information identifying the plurality of users is executed based on user information identifying one user of the plurality of users. The control measure is implemented to prevent output execution of the executed output data.

15 Claims, 24 Drawing Sheets

Authentication

Login User Name:

Login Password:

Reenter the confirmation password:

Delegation Group: ~1001

OK    Cancel

| USER ID | USER NAME | DISPLAY NAME | LOGIN USER NAME | E-MAIL ADDRESS | FAX NUMBER | GROUP |
|---|---|---|---|---|---|---|
| 1 | tom | Tom | tom_x | tom_x@test.com | 1234 | secretary |
| 2 | sam | Sam | y_sam | y_sam@test.com | 5678 | secretary |
| 3 | john | John | john_2008 | john_2008@test.com | 9876 | manager |
| 4 | jay | Jay | jay | jay@test.com | 5432 | secretary |
| 5 | jerry | Jerry | jerry_1234 | jerry_1234@test.com | 7654 | manager |

FIG.10

| JOB NAME | NUMBER OF PAGES | NUMBER OF COPIES | STORAGE TIME | PRINT TIME | PRINT COMPLETION STATUS | DELEGATED USER | SUBMITTING USER |
|---|---|---|---|---|---|---|---|
| a | 2 | 1 | 12:02 | 12:05 | DONE | tom | A |
| b | 2 | 1 | 12:32 | | NOT DONE | jim | B |
| c | 2 | 1 | 12:52 | | NOT DONE | | C |
| d | 2 | 1 | 14:45 | | NOT DONE | tom,jim,sam | A |
| e | 2 | 1 | 14:55 | | NOT DONE | | E |

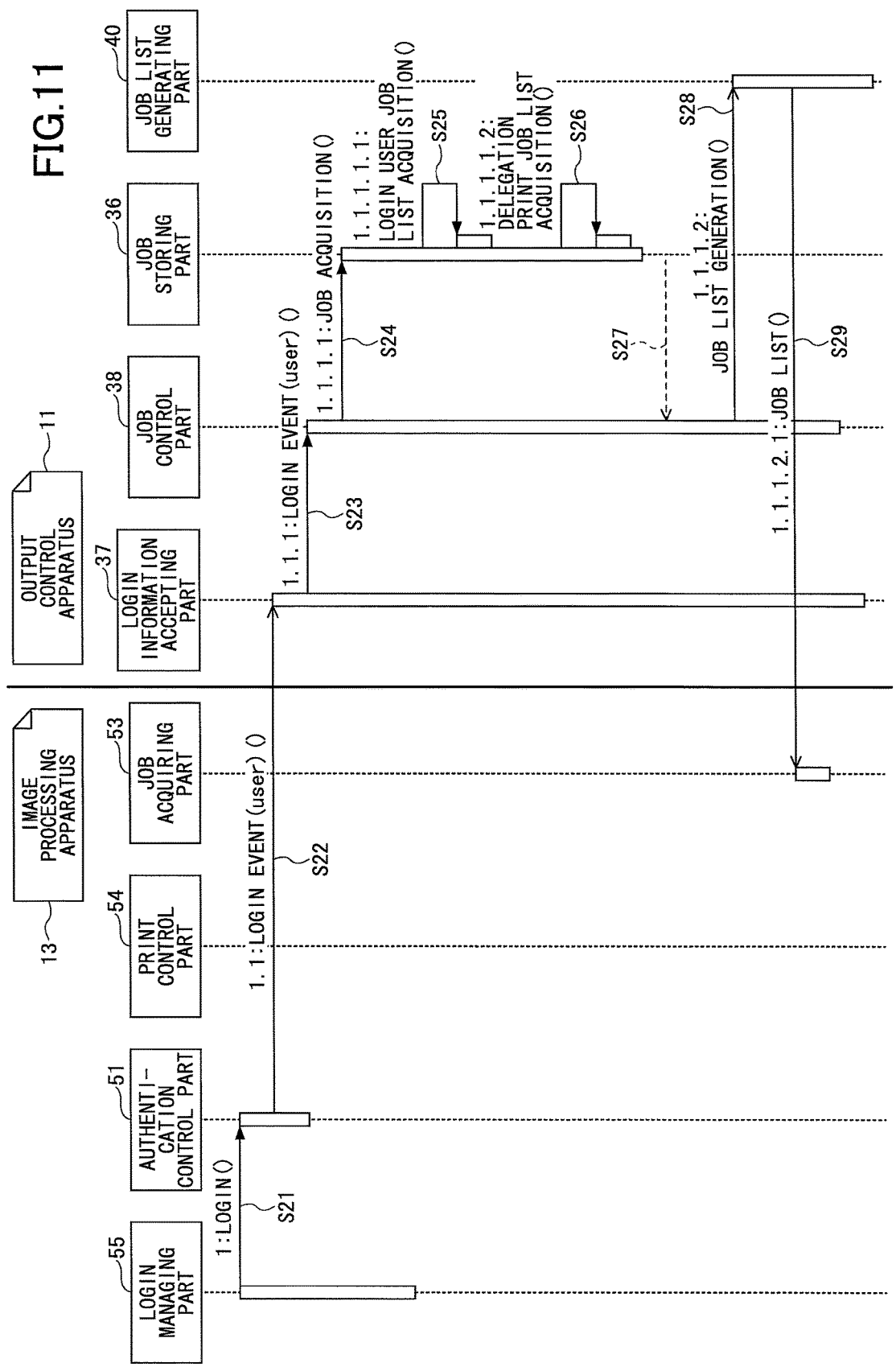

FIG.13

| JOB NAME | NUMBER OF PAGES | NUMBER OF COPIES | STORAGE TIME | PRINT TIME | PRINT COMPLETION STATUS | SHARING USERS | SUBMITTING USER | MODE |
|---|---|---|---|---|---|---|---|---|
| a | 2 | 1 | 12:02 | 12:05 | DONE | tom | A | 1 |
| b | 2 | 1 | 12:32 | | NOT DONE | jim | B | 1 |
| c | 2 | 1 | 12:52 | | NOT DONE | | C | |
| d | 2 | 1 | 14:45 | | NOT DONE | tom,jim,sam | A | 2 |
| e | 2 | 1 | 14:55 | | NOT DONE | tom,sam | E | 1 |

FIG.16

USER INFORMATION

| COMPANY INFORMATION | COMPANY CODE | BRANCH OFFICE NAME | BRANCH OFFICE CODE | USER NAME | PASSWORD | ADDRESS INFORMATION | GROUP |
|---|---|---|---|---|---|---|---|
| COMPANY A | XXX | BRANCH OFFICE A | A | User A | AAA | A@aaa.com | aa |
| | | | | User B | BBB | B@aaa.com | bb |
| | | BRANCH OFFICE B | B | User C | CCC | C@aaa.com | aa |
| COMPANY B | YYY | — | — | User A | AAA | A@bbb.com | cc |
| | | | | User D | DDD | D@bbb.com | cc |

FIG.17

COMPANY/DEVICE INFORMATION

| COMPANY CODE | BRANCH OFFICE NAME | BRANCH OFFICE CODE | DEVICE INFORMATION |
|---|---|---|---|
| XXX | BRANCH OFFICE A | A | 111 |
| | BRANCH OFFICE B | B | 222 |
| | BRANCH OFFICE C | C | 333 |
| YYY | — | — | 444 |

FIG.20

JOB MANAGEMENT TABLE

| COMPANY INFORMATION | JOB ID | USER NAME | PASSWORD | SHARING USERS | MODE | DESIGNATED LOCATION |
|---|---|---|---|---|---|---|
| COMPANY A | 1 | User A | AAA | User B, User C | 1 | — |
| | 2 | User B | BBB | User A, User C | 1 | BRANCH OFFICE A |
| | 3 | User C | CCC | User A, User B | 2 | BRANCH OFFICE C |
| COMPANY B | 4 | User A | AAA | — | — | — |
| | 5 | User D | DDD | — | — | — |

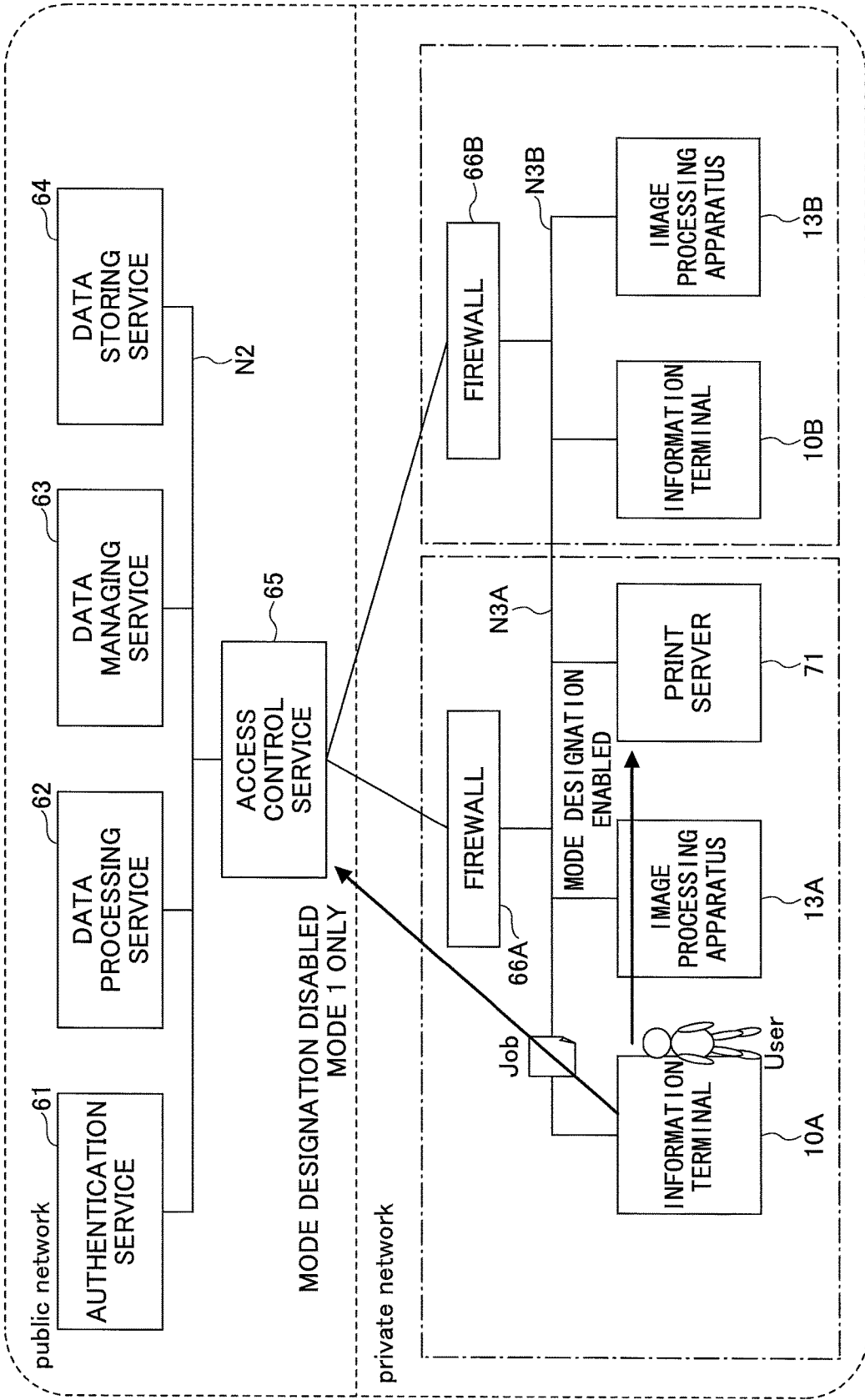

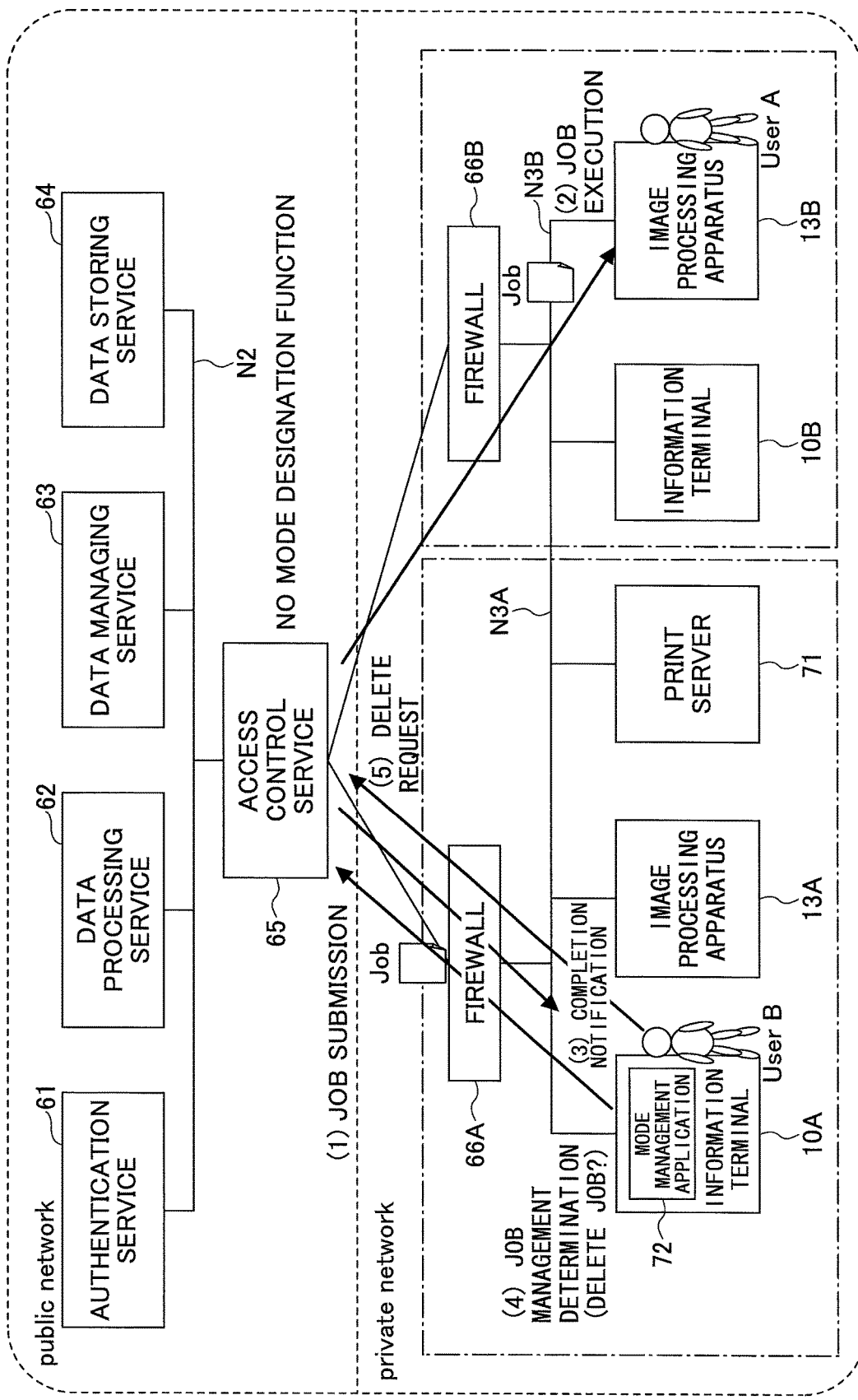

APPARATUS AND SYSTEM FOR CONTROLLING OUTPUT OF DATA

BACKGROUND OF THE INVENTION

1. Field of the Invention

The disclosures herein generally relate to an apparatus and a system for controlling output of data.

2. Description of the Related Art

Systems are known that enable a user to transmit a print job from a personal computer to a printer and spool (store) the print job at the printer. The accumulated print job may be executed when the user issues a print command via an operation screen of the printer.

Also, systems are known that support a so-called Pull Printing feature that enables a plurality of users to share a print job. A user may execute the print job by selecting the print job from a list of stored print jobs at a printer (See e.g., Japanese Laid-Open Patent Publication No. 2011-243094).

Although such known systems enable a plurality of users to share a print job, these systems lack the capacity to provide flexible accommodations for various manners of sharing a print job.

SUMMARY OF THE INVENTION

It is a general object of at least one embodiment of the present invention to provide an apparatus and system that substantially obviate one or more problems caused by the limitations and disadvantages of the related art.

According to one embodiment of the present invention, an apparatus includes a data receiving part that receives output data from an information terminal; a data recording part that records the output data received by the data receiving part in a storage part in association with user information identifying a plurality of users; an information accepting part that accepts user information identifying a user; a first control part that controls output execution of output data included in the recorded output data that is associated with the user information accepted by the information accepting part; and a second control part that implements a control measure after the output data associated with the user information identifying the plurality of users is executed based on user information identifying one user of the plurality of users. The control measure is implemented to prevent output execution of the executed output data.

According to another embodiment of the present invention, a data providing system includes a service that comprises at least one information processing apparatus and is configured to record data and provide the recorded data upon request; an information terminal that transmits data to the service; and a processing apparatus that executes a process on data received from the service. The service includes a data receiving part that receives the data transmitted from the information terminal; a data recording part that records the data received by the data receiving part in a storage part in association with user information identifying a plurality of users; an information accepting part that accepts user information identifying a user from the processing apparatus; a first control part that provides data of the recorded data that is associated with the user information accepted by the information accepting part to the processing apparatus; and a second control part that implements a control measure when the data associated with the user information identifying the plurality of users is provided based on user information identifying one user of the plurality of users. The control measure is implemented to prevent the data associated with the user information identifying the plurality of users from being provided based on the user information identifying the plurality of users.

According to an aspect of the present invention, an apparatus and a system may be provided that are capable of flexibly providing accommodations for various manners of sharing a print job.

BRIEF DESCRIPTION OF THE DRAWINGS

FIG. 5 illustrates an exemplary authentication screen for designating a delegation print executor;

FIG. 9 is a table illustrating an exemplary configuration of user information managed by a user information managing part according to an embodiment of the present invention;

FIG. 10 is a table illustrating an exemplary configuration of print job management information for managing a print job according to an embodiment of the present invention;

FIG. 11 is a sequence chart illustrating exemplary process steps of a job list acquisition process according to an embodiment of the present invention;

FIG. 13 is a table illustrating an exemplary configuration of print job management information for managing a print job according to another embodiment of the present invention;

FIG. 16 is a table illustrating an exemplary configuration of user information according to an embodiment of the present invention;

FIG. 17 is a table illustrating an exemplary configuration of company/device information according to an embodiment of the present invention;

FIG. 20 is a table illustrating an exemplary configuration of a job management table as another example of print job management information;

FIG. 24 illustrates exemplary measures that may be implemented in a case where a mode designation function is not supported in a cloud environment of a system according to an embodiment of the present invention; and FIG. 25 illustrates other exemplary measures that may be implemented in the case where a mode designation function is not supported in the cloud environment.

DESCRIPTION OF THE PREFERRED EMBODIMENTS

In the following, embodiments of the present invention are described with reference to the accompanying drawings.

First Embodiment

<System Configuration>

Figure 1:
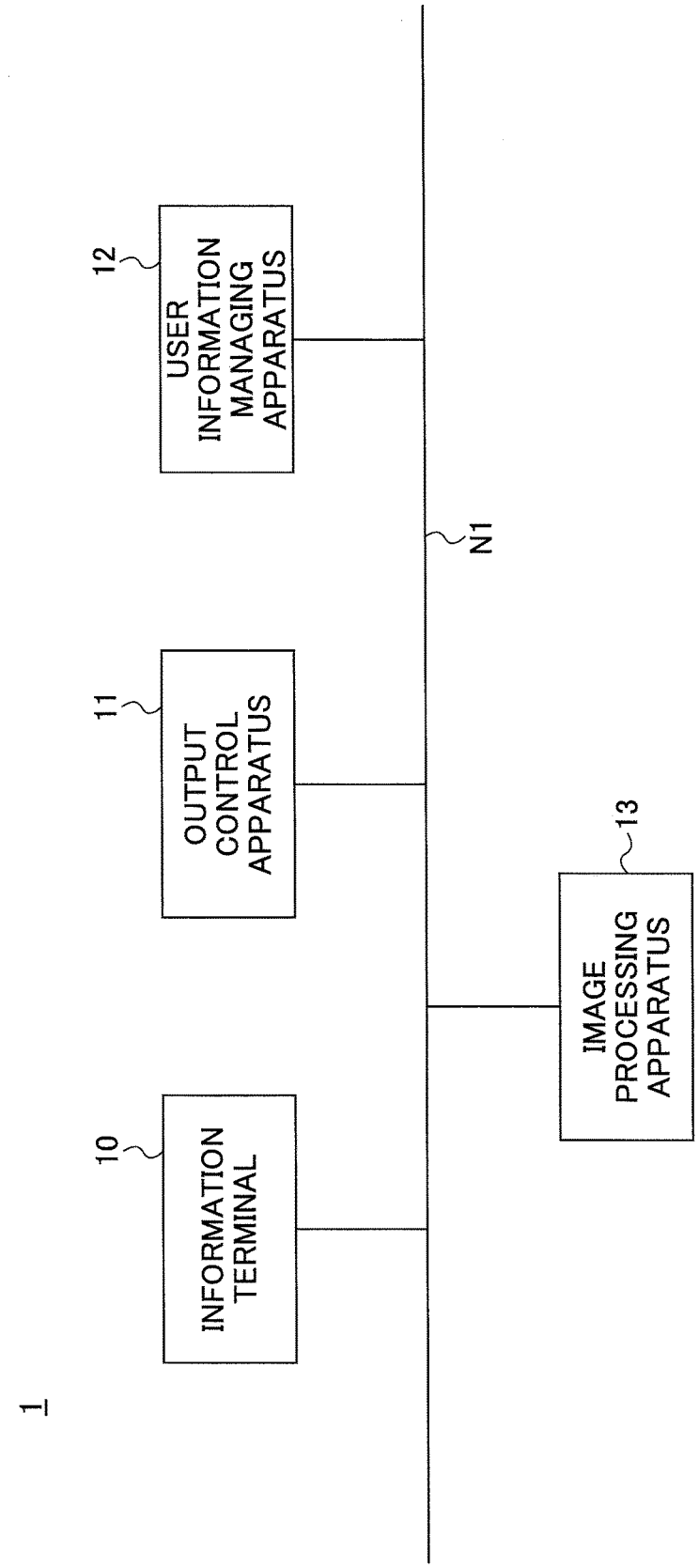
FIG. 1 illustrates an exemplary configuration of a system according to an embodiment of the present invention.

FIG. 1 illustrates an exemplary configuration of a system 1 according to an embodiment of the present invention. The system 1 illustrated in FIG. 1 includes an information terminal 10, an output control apparatus 11, a user information managing apparatus 12, and an image processing apparatus 13 that are interconnected via a network N1 such as the Internet or a LAN (local area network). Although only one output control apparatus 11 and only one image processing apparatus 13 is illustrated in FIG. 1, the system 1 may include more than one of these apparatuses.

The output control apparatus 11 may be a print server, for example. The output control apparatus 11 accepts a submission of a print job from the information terminal 10, for example. A print job is an example of output data that may be controlled in the system 1 of the present embodiment. The output control apparatus 11 accepts an acquisition request for a print job from the image processing apparatus 13 and provides the print job to the image processing apparatus 13, for example.

The user information managing apparatus 12 may be an Active Directory, for example. The user information managing apparatus 12 manages user information. Also, as described in detail below, the user information managing apparatus 12 manages and associates group information with delegated user information. In response to an inquiry from the output control apparatus 11, the user information managing apparatus 12 provides delegated user information associated with group information.

The information terminal 10 may be any terminal that can be operated by a user such as a smart phone, a cell phone, a tablet PC, or a notebook PC. When the user wishes to have a print job executed by another user (delegation print), the user may use the information terminal 10 to submit the print job to the output control apparatus 11. Delegation print refers to a user submitting a print job and allowing the print job to be executed by another user. For example, in the case of requesting delegation print, the user may designate via a print driver a delegated user or group to which a print job is to be delegated.

The image processing apparatus 13 may be any apparatus having a printing function such as a printer or a multifunction peripheral (MFP). The image processing apparatus 13 is an example of an apparatus that executes a print job. The image processing apparatus 13 accepts login information from the user and acquires a job list of the user from the output control apparatus 11. The job list from the output control apparatus 11 may include print jobs submitted by the user logging in as well as print jobs delegated to this user by another user.

The user operates the image processing apparatus 13 to select a print job to be executed from the job list. The image processing apparatus 13 acquires the print job selected by the user from the output control apparatus 11 and executes the selected print job. In the case where the executed print job corresponds to a delegation print job, the output control apparatus 11 may delete the executed print job, for example, to prevent other delegation print executors from executing the print job once the delegation print job is executed by one of the delegation print executors.

In some embodiments, the output control apparatus 11 and the user information managing apparatus 12 of the system 1 may be embodied in a single computer. In other embodiments, the output control apparatus 11 and the user information managing apparatus 12 may be embodied by plural computers. Further, in some embodiments, the output control apparatus 11 and/or the user information managing apparatus 12 and the image processing apparatus 13 may be embodied in a single computer.

As can be appreciated, in the system 1 illustrated in FIG. 1, the user submits a print job from the information terminal 10 to the output control apparatus 11. The user designates a delegated user or group to which the print job is to be delegated via a printer driver, for example. In the case where a group is designated as a delegation print executor that is allowed to execute the print job, the output control apparatus 11 sends an inquiry to the user information managing apparatus 12 to acquire information on the delegated users associated with the designated group.

For example, upon accepting login information from a user, the image processing apparatus 13 may acquire from the output control apparatus 11 a job list of the user including print jobs submitted to the output control apparatus 11 by the user as well as print jobs delegated to the user by another user and display the acquired job list on an operation panel. In this way, the user may check the job list including the print jobs that are delegated to the user by another user at the operation panel.

<Hardware Configuration>

Figure 2:
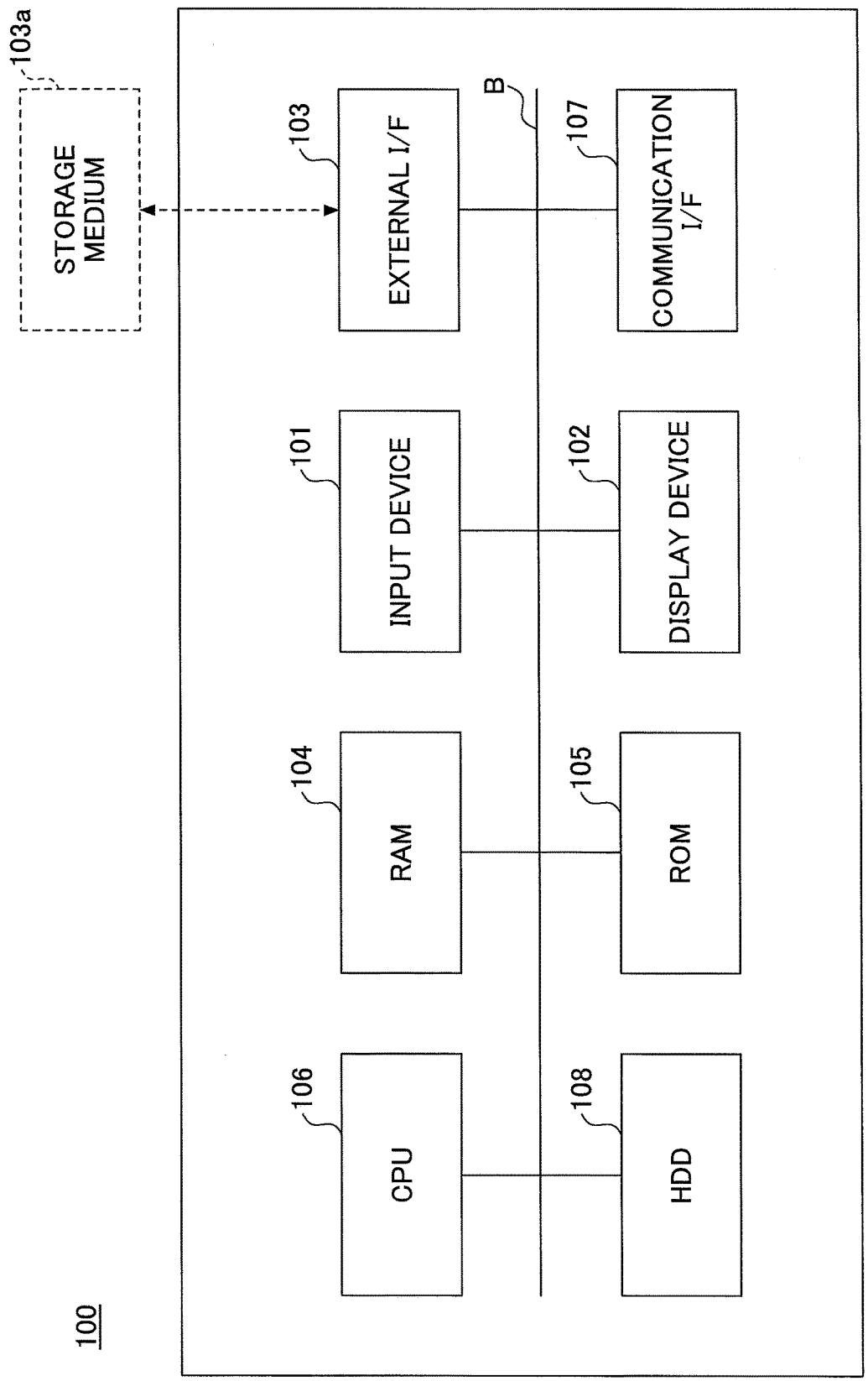
FIG. 2 illustrates an exemplary hardware configuration of a computer system according to an embodiment of the present invention.

The information terminal 10, the output control apparatus 11, and the user information managing apparatus 12 may include a computer system having a hardware configuration as illustrated in FIG. 2, for example. FIG. 2 illustrates an exemplary hardware configuration of a computer system 100 according to an embodiment of the present invention.

The computer system 100 illustrated in FIG. 2 includes an input device 101, a display device 102, an external I/F (interface) 103, a RAM (random access memory) 104, a ROM (read only memory) 105, a CPU (central processing unit) 106, a communication I/F 107, and a HDD (hard disk drive) 108 that are interconnected via a bus B.

The input device 101 is used by the user to input various operation inputs and may include a keyboard and a mouse, for example. The display device 102 may include a display that displays processing results of the computer system 100, for example.

The communication I/F 107 is an interface that connects the computer system 100 to a network N1. In this way, the computer system 100 may establish communication with external systems and devices via the communication I/F 107. The communication established by the communication I/F 107 may be wired or wireless communication.

The HDD 108 is a nonvolatile storage device that stores programs and data such as an OS (operating system) including basic software for controlling overall operations of the computer system 100 and application software that is run on the OS to implement various functions of the computer system 100. The HDD 108 includes a file system and/or a DB (database) for managing the programs and data stored therein.

The external I/F 103 is an interface with an external device such as a storage medium 103a. The computer system 100 may read/write data from/on the storage medium 103a via the external I/F 103. The storage medium 103a may be any computer-readable media except for a transitory propagating signal. For example, the storage medium 103a may be a flexible disk, a CD (compact disk), a DVD (digital versatile disk), a SD memory card, or a USB (universal serial bus) memory.

The ROM 105 is a nonvolatile semiconductor memory (storage device) that is capable of retaining data and programs even when the power of the computer system 100 is turned off. The ROM 105 stores programs and data such as BIOS (basic input/output system) that is executed upon starting the computer system 100, OS settings, and network settings. The RAM 104 is a volatile semiconductor memory (storage device) that temporarily stores program and data.

The CPU 106 reads the programs and data stored in the ROM 105 and the HDD 108 and loads the programs and data on the RAM 104 to execute various processes. In this way, the CPU 106 implements various functions and controls overall operations of the computer system 100.

By configuring the information terminal 10, the output control apparatus 11, and the user information managing apparatus 12 of the present embodiment to have the above-described hardware configuration of the computer system 100, various functions and processes of the system 1 may be implemented as described below.

Figure 3:
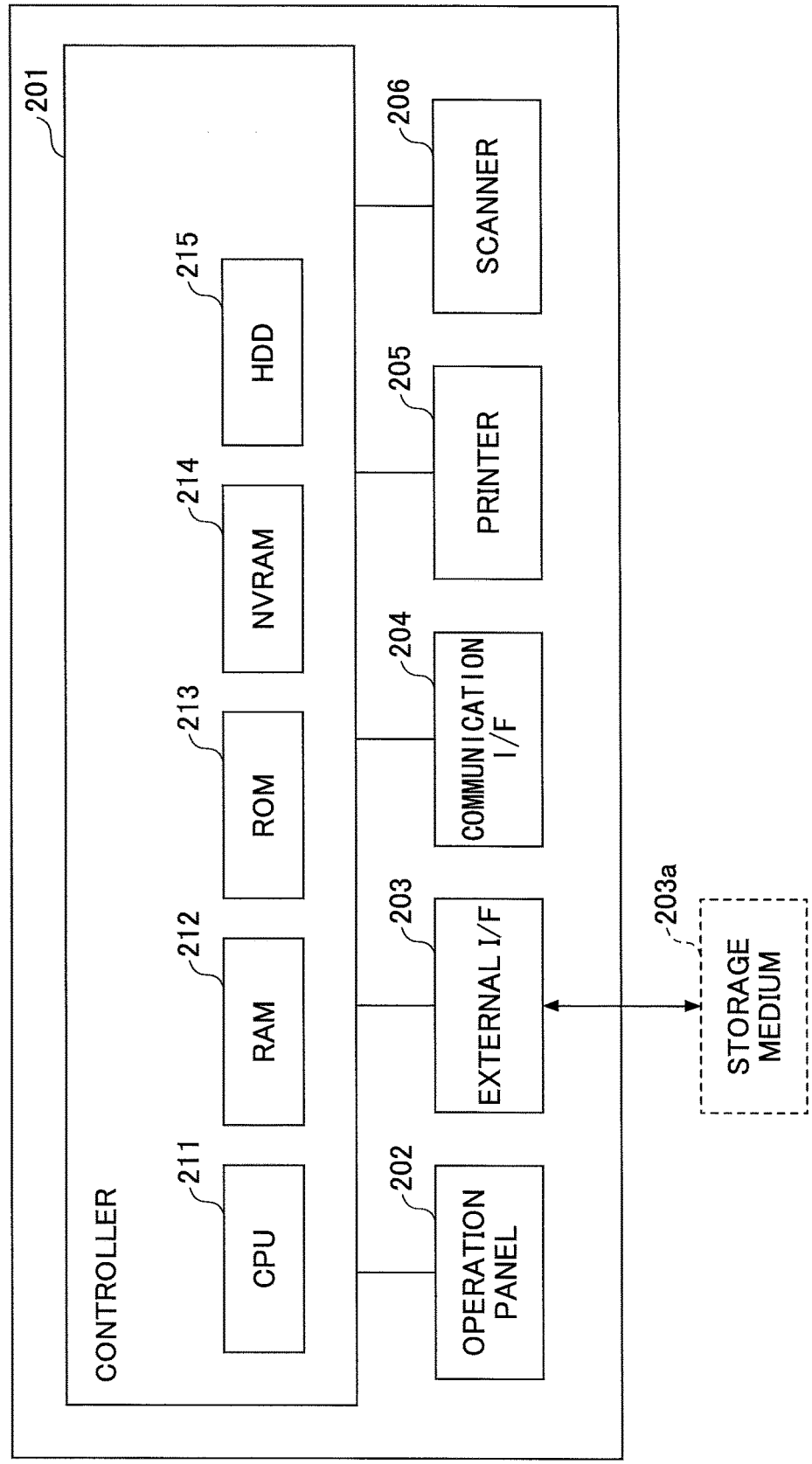
FIG. 3 illustrates an exemplary hardware configuration of an information processing apparatus according to an embodiment of the present invention.

FIG. 3 illustrates an exemplary hardware configuration of the image processing apparatus 13. In FIG. 3, the image processing apparatus 13 includes a controller 201, an operation panel 202, an external I/F 203, a communication I/F 204, a printer 205, and a scanner 206, for example.

The controller 201 includes a CPU 211, a RAM 212, a ROM 213, a NVROM 214, and a HDD 215. The ROM 213 has various programs and data stored therein. The RAM 212 temporarily stores programs and data read from the ROM 213, the NVRAM 214, or the HDD 215, for example. The NVRAM 214 may have setting information stored therein, for example. The HDD 215 may have various programs and data stored therein.

The CPU 211 reads the programs, data, and setting information stored in the ROM 213, the NVRAM 214, and the HDD 215; loads the read program, data, and/or setting information on the RAM 212 to execute functions and control overall operations of the image processing apparatus 13.

The operation panel 202 includes an input part for accepting inputs from the user and a display part for displaying information. The external I/F 203 is an interface with an external device such as a storage medium 203a. The image processing apparatus 13 may read/write data from/on the storage medium 203a via the external I/F 203. The storage medium 203a may be any computer-readable media except for a transitory propagating signal. For example, the storage medium 203a may be a flexible disk, a CD, a DVD, a SD memory card, or a USB memory.

The communication I/F 204 is an interface that connects the image processing apparatus 13 to the network N1. In this way, the image processing apparatus 13 may establish communication with external systems and devices via the communication I/F 204. The communication established by the communication I/F 204 may be wired or wireless communication.

The printer 205 is a device that prints print data on a sheet. The scanner 204 is a device that scans (reads) image data from a document. By configuring the image processing apparatus 13 to have the above-described hardware configuration, the image processing apparatus 13 of the present embodiment may implement various functions and processes as described below.

<Software Configuration>

Figure 4:
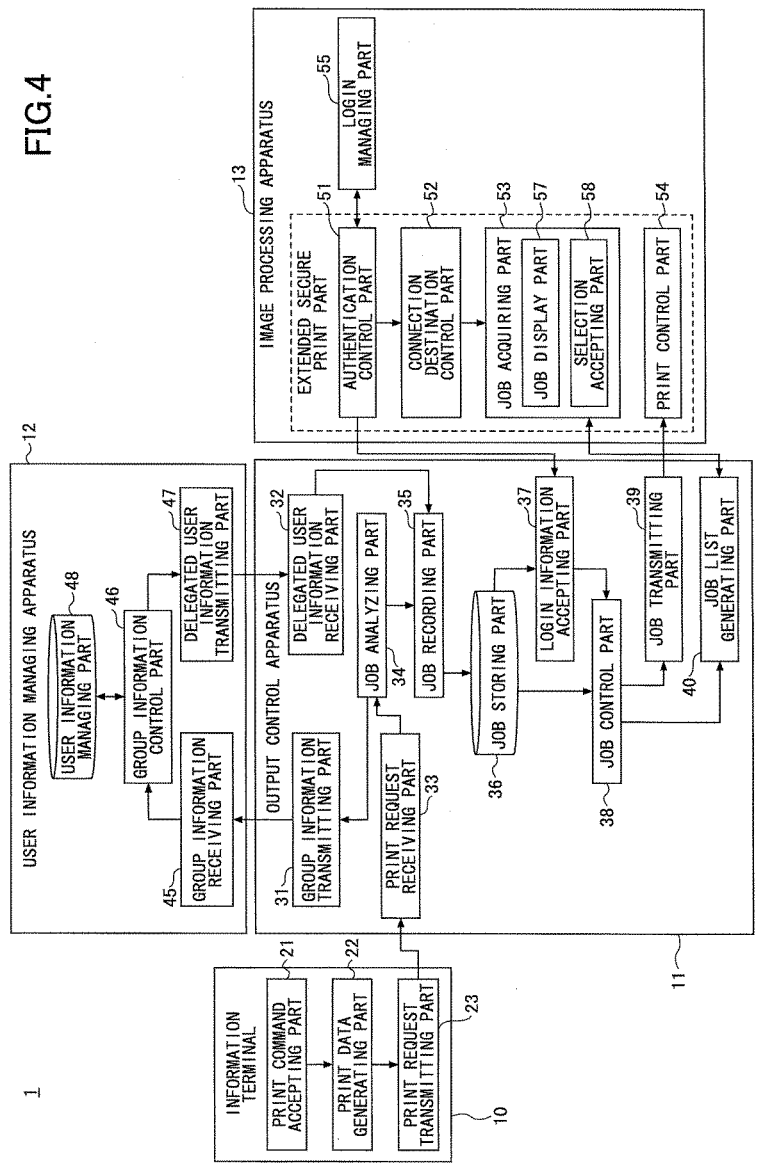
FIG. 4 is a block diagram illustrating exemplary functional features of a system according to an embodiment of the present invention.

The system 1 of the present embodiment may have functional features as illustrated in FIG. 4, for example. FIG. 4 is a block diagram illustrating exemplary functional features of the system 1.

<<Information Terminal 10>>

The information terminal 10 executes a corresponding program to implement a print command accepting part 21, a print data generating part 22, and a print request transmitting part 23. The print command accepting part 21 accepts a print command from the user. The print data generating part 22 generates print data based on the print command accepted from the user. The print request transmitting part 23 transmits the generated print data to the output control apparatus 11.

<<Output Control Apparatus 11>>

The output control apparatus 11 executes a corresponding program to implement a group information transmitting part 31, a delegated user information receiving part 32, a print request receiving part 33, a job analyzing part 34, a job recording part 24, a job storing part 36, a login information accepting part 37, a job control part 38, a job transmitting part 39, and a job list generating part 40.

The print request accepting part 33 receives the print request from the information terminal 10. The job analyzing part 34 analyzes print data included in the print request received by the print request accepting part 33. In a case where the print data includes information on a delegation print executor that is allowed to execute a corresponding print job (delegation print job), the job analyzing part 34 acquires the information on the delegation print executor from the print data.

In the case where the information on the delegation print executor is represented by group information, the group information transmitting part 31 transmits the group information to the group information managing apparatus 12. In turn, the delegated user information receiving part 32 receives from the user information managing apparatus 12 delegated user information that is associated with the group information, which has been transmitted by the group information transmitting part 31. The job recording part 35 records users represented by the delegated user information as delegated users that are allowed to execute delegation print job.

In the case where the information on the delegation print executor corresponds to user information, the job analyzing part 34 transmits the user information to the job recording part 35. The job recording part 35 records the user represented by the user information as a delegated user that is allowed to execute the delegation print job. The job recording part 35 associates the print request received from the information terminal 10 with the delegated user and stores the print request associated with the delegated user as a print job in the job storing part 36.

The login information accepting part 37 accepts login information from the image processing apparatus 13. The job control part 38 sends a request to the job list generating part 40 to generate a job list for a login user that has logged in. The job list generating part 40 generates a job list including print jobs submitted by the login user as well as print jobs delegated to the login user by another user. Then, the job list generating part 40 transmits the generated job list to the image processing apparatus 13.

The job list generating part 40 also accepts an acquisition request for a print job selected by the user from the image processing apparatus 13. The job control part 38 sends a request to the job transmitting part 39 to transmit the selected print job to the image processing apparatus 13. In turn, the job transmitting part 39 transmits corresponding print data of the selected print job to the image processing apparatus 13. In the case where the selected print job corresponds to a delegation print job, the job control part 38 may delete the delegation print job once it is executed by one of the delegation print executors, for example, in order to prevent plural delegation print executors from executing the delegation print job.

<<User Information Managing Apparatus 12>>

The user information managing apparatus 12 executes a corresponding program to implement a group information receiving part 45, a group information control part 46, a delegated user information transmitting part 47, and a user information managing part 48.

The group information receiving part 45 receives group information from the output control apparatus 11. The group information control part 46 acquires delegated user information associated with the received group information from the user information managing part 48. The delegated user information transmitting part 47 transmits the delegated user information associated with the received group information to the output control apparatus 11. The user information managing part 48 manages and associates group information with delegated user information.

<<Image Processing Apparatus 13>>

The image processing apparatus 13 executes a corresponding program to implement an authentication control part 51, a connection destination control part 52, a job acquiring part 53, a print control part 54, and a login managing part 55. The job acquiring part 53 includes a job display part 57 and a selection accepting part 58.

The login managing part 55 accepts login information from a user (login user) and manages the login information. The authentication control part 51 transmits the login information (e.g., user name) of the login user to the output control apparatus 11. The connection destination control part 52 controls the connection destination of the output control apparatus 11 based on the login information of the login user.

The job display part 57 of the job acquiring part 53 displays the job list acquired from the output control apparatus 11. In turn, the user operates the image processing apparatus 13 to select a print job to be executed from the job list. The selection accepting part 58 accepts the selection made by the user and sends an acquisition request to the output control apparatus 11 for the print job selected by the user. The print control part 54 receives the print data of the print job selected by the user from the output control apparatus 11 and executes the print job.

As illustrated in FIG. 4, in one preferred embodiment, the authentication control part 51, the connection destination control part 52, and the job acquiring part 53, the print control part 54 may implement a secure print function by executing an application for enabling extended secure printing, for example.

<Operation Processes>

In the following, detailed operation processes of the system 1 of the present embodiment are described.

<<Information Terminal 10>>

Figure 6:
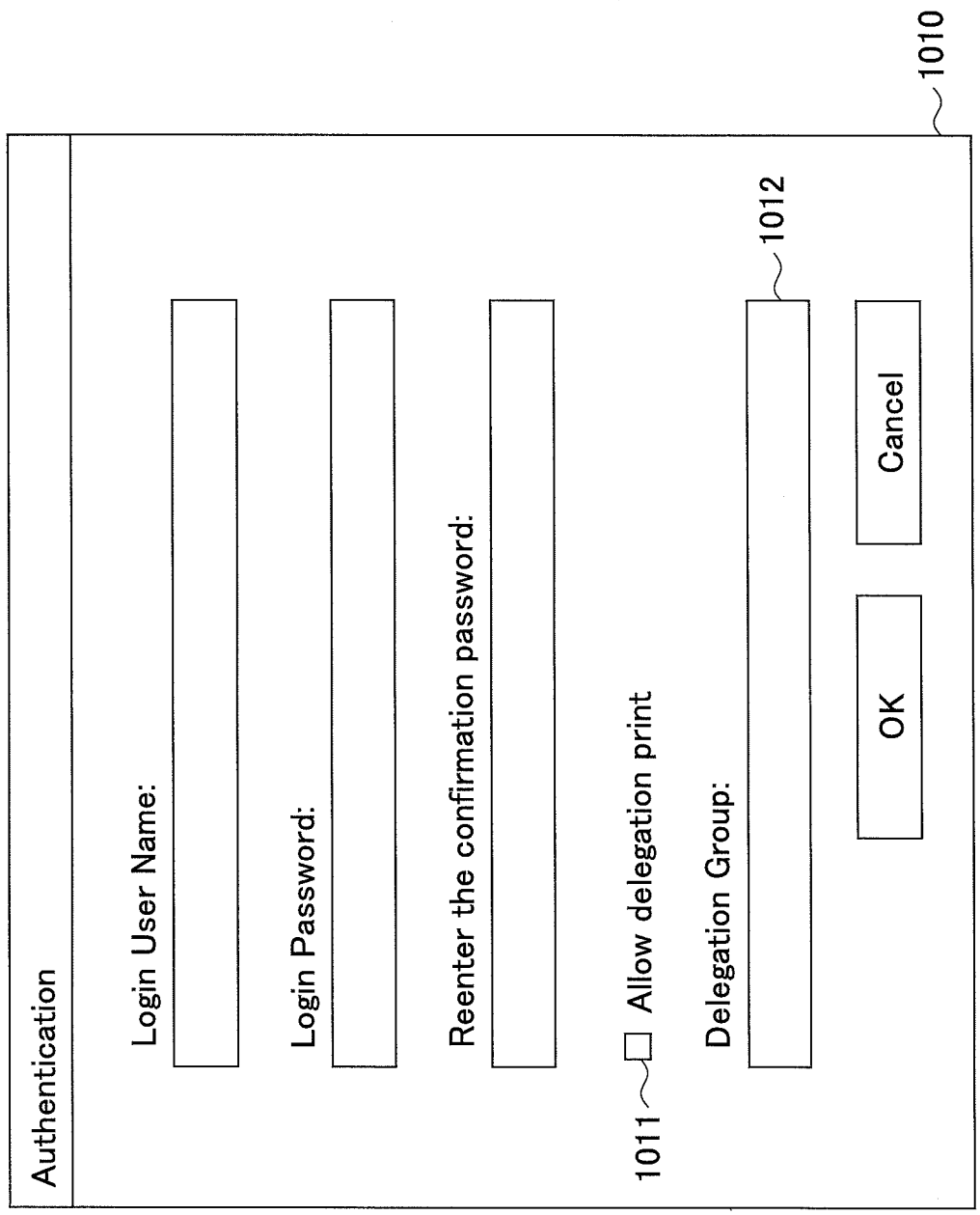
FIG. 6 illustrates another exemplary authentication screen for designating a delegation print executor according to an embodiment of the present invention.

The information terminal 10 may designate a delegation print executor via an authentication screen such as that illustrated in FIG. 5 or FIG. 6, for example. FIG. 5 illustrates an exemplary authentication screen 1000 for enabling designation of a delegation print executor. FIG. 6 illustrates another exemplary authentication screen 1010 for enabling designation of a delegation print executor.

The authentication screen 1000 illustrated in FIG. 5 includes a field 1001 for designating a delegation print executor by group information or delegated user information. The user may designate a delegation print executor by inputting group information or delegated user information in the field 1001 to issue a delegation print command. The authentication screen 1010 illustrated in FIG. 6 includes a check field 1011 for designating (allowing) delegation print and a field 1012 for designating a delegation print executor by group information or delegated user information. The user may input a checkmark in the check field 1011 and designate a delegation print executor by inputting group information or delegated user information in the field 1012 to issue a delegation print command.

<<Print Job Submission Process>>

Figure 7:
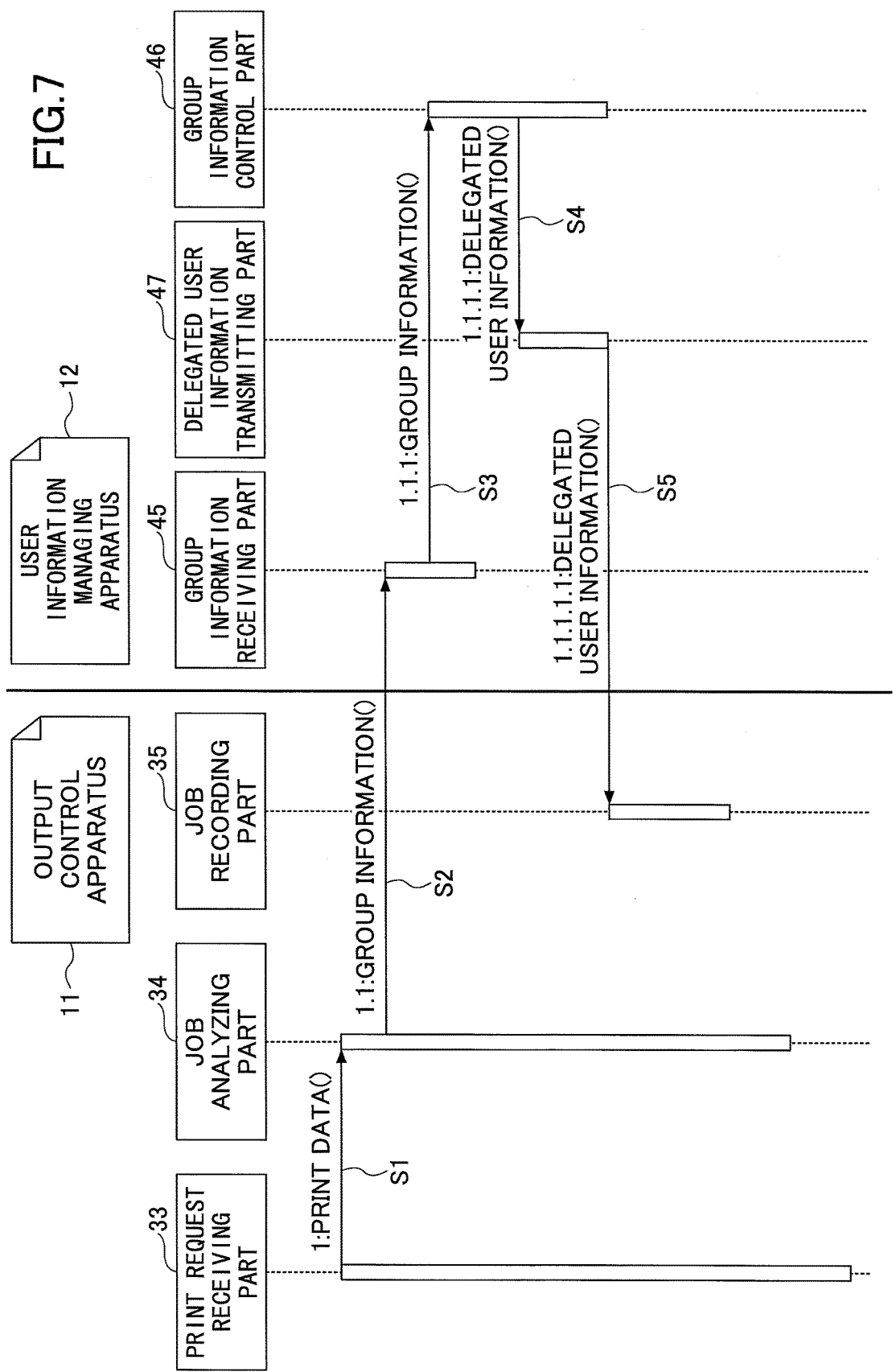
FIG. 7 is a sequence chart illustrating exemplary process steps of a print job submission process according to an embodiment of the present invention.

FIG. 7 is a sequence chart illustrating exemplary process steps of a print job submission process. In step S1, when the print request receiving part 33 receives a print request from the information terminal 10, the print request receiving part 33 transmits print data included in the print request to the job analyzing part 34. The job analyzing part 34 analyzes the print data transmitted from the print request receiving part 33.

In step S2, in the case where information on a delegation print executor is represented by group information, the job analyzing part 34 prompts the group information transmitting part 31 to transmit the group information to the group information receiving part 45 of the user information managing apparatus 12. In step S3, the group information receiving part 45 transmits the group information received from the output control apparatus 11 to the group information control part 46.

The group information control part 46 acquires delegated user information associated with the received group information from the user information managing part 48. In step S4, the group information control part 46 transmits the delegated user information associated with the received group information to the delegated user information transmitting part 47. In step S5, the delegated user information transmitting part 47 transmits the delegated user information associated with the group information to the delegated user information receiving part 32 of the output control apparatus 11. In turn, the delegated user information receiving part 32 transmits the received delegated user information to the job recording part 35. The job recording part 35 associates the delegated user information with the print request from the information terminal and stores the print request associated with the delegated user information as a print job in the job storing part 36.

In the print job submission process illustrated in FIG. 7, when print data of a print request includes information on a delegation print executor who is allowed to execute a delegation print job and the information on the delegation print executor is represented by group information, the output control apparatus 11 sends an inquiry to the user information managing apparatus 12 to acquire delegated user information associated with the group information.

<<Delegation Print Determination Process>>

Figure 8:
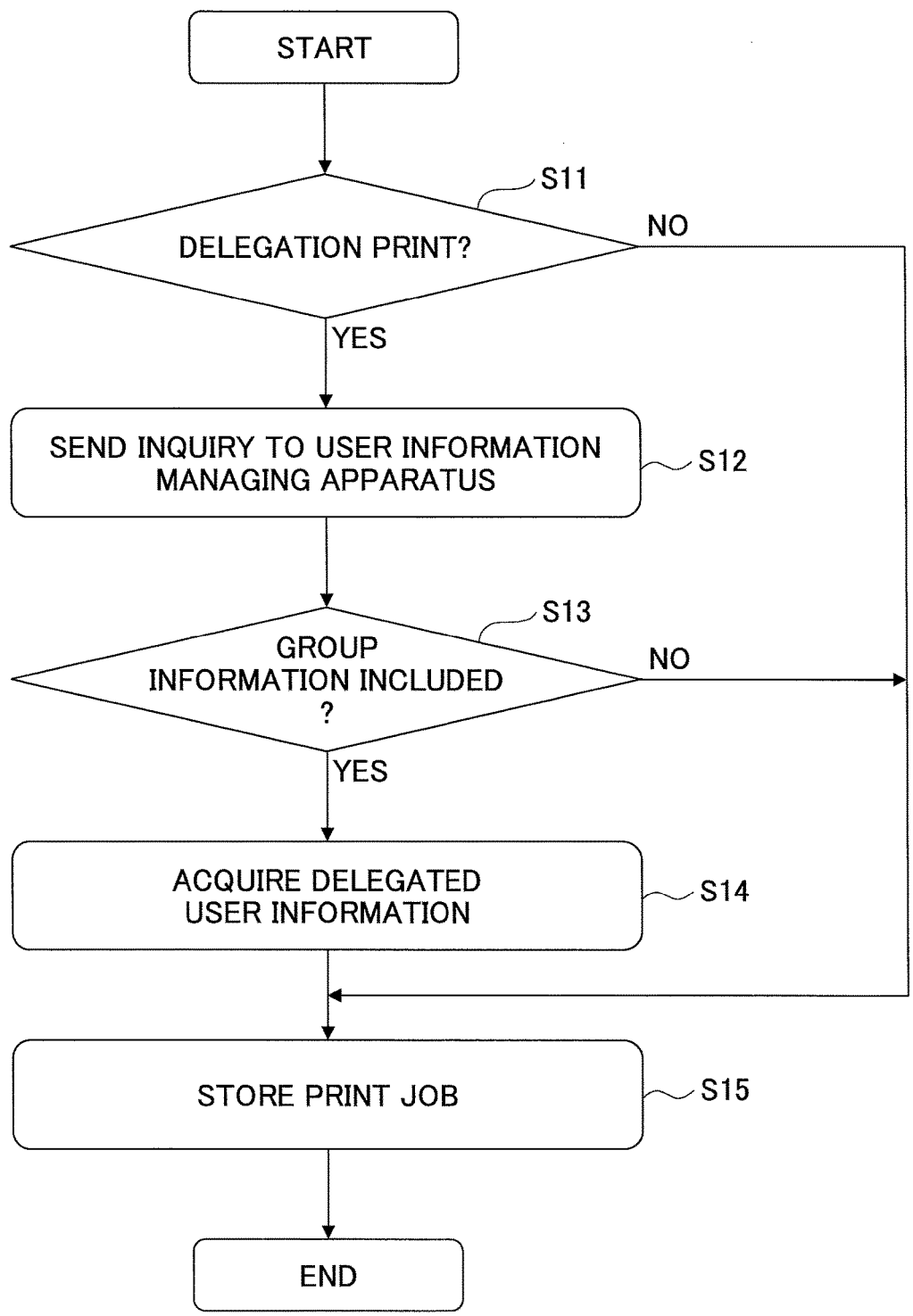
FIG. 8 is a flowchart illustrating exemplary process steps of a delegation print determination process according to an embodiment of the present invention.

FIG. 8 is a flowchart illustrating exemplary process steps of at delegation print determination process. In step S11, the job analyzing part 34 analyzes the print data of the print request received by the print request receiving part 33. The job analyzing part 34 determines whether the received print request is a delegation print request. For example, the job analyzing part 34 may determine that the received print request is a delegation print request if information on a delegation print executor is included in a delegated user field of the print data included in the received print request.

In step S12, in the case where the information on the delegation print executor is represented by group information, the job analyzing part 34 prompts the group information transmitting part 31 to transmit the group information to the group information receiving part 45 of the user information managing apparatus 12 to make an inquiry on delegated user information associated with the group information.

In step S13, the group information control part 46 determines whether the group information received from the output control apparatus 11 is included in the group information managed by the user information managing part 48. If the group information received from the output control apparatus 11 is included in the group information managed by the user information managing part 48, the group information control part 46 proceeds to step S14 and acquires delegated user information associated with the received group information from the user information managing part 48. The group information control part 46 then prompts the delegated user information transmitting part 47 to transmit the delegated user information associated with the received group information to the delegated user information receiving part 31 of the output control apparatus 11.

In step S15, the job recording part 35 associates the print request received from the information terminal 10 with the delegated user information and stores the print request associated with the delegated user information as a print job in the job storing part 36. In the case where it is determined in step S11 that the print request is not a delegation print request, or in the case where it is determined in step S13 that the group information received from the output control apparatus 11 is not included in the group information managed by the user information managing part 48, the process proceeds to step S15 and the job recording part 35 stores the print request received from the information terminal 10 as a print job in the job storing part 36.

In the delegation print determination process illustrated in FIG. 8, even when information on a delegation print executor that is allowed to execute a delegation print job is represented by group information in the print data of a print request, the output control apparatus 11 may associate the print request with delegated user information indicating the delegated users included in the group information and store the print request associated with the delegated user information in the job storing part 36.

In the example illustrated in FIG. 8, the output control apparatus 11 is configured to send an inquiry to the user information managing apparatus 12 when the information on the delegation print executor is represented by group information. However, in other examples, the output control apparatus 11 may be configured to send an inquiry to the user information managing apparatus 12 even when the information on the delegation print executor is not represented by group information.

FIG. 9 is a table illustrating an exemplary configuration of user information managed by the user information managing part 48. The user information illustrated in FIG. 9 includes user ID, user name, display name, login user name, e-mail address, fax number, and group as data items. The user information managing part 48 may store user information having a configuration as illustrated in FIG. 9 to manage information on the group to which a user belongs.

For example, in a case where group information "secretary" is received from the output control apparatus 11, the group information control part 46 may acquire the user names "Tom" and "Sam" as delegated user information associated with the group information "secretary."

FIG. 10 is a table illustrating an exemplary configuration of print job management information for managing print jobs. The print job management information illustrated in FIG. 10 may be stored in the job storing part 36, for example. The print job management information of FIG. 10 includes job name, number of pages, number of copies, storage time, print time, print completion status, delegated user, and submitting user as data items.

The job name is information for identifying the print job. The submitting user is information for identifying the user that has submitted the print job. The delegated user is information for identifying the user designated by the submitting user as the delegation print executor that is allowed to execute the print job.

<<Job List Acquiring Process>>

FIG. 11 is a sequence chart illustrating exemplary process steps of a job list acquiring process. In step S21, the login managing part 55 of the image processing apparatus 13 notifies the authentication control part 51 of a login accepted from a login user. In step S22, the authentication control part 51 notifies the login information receiving part 37 of the output control apparatus 11 of a login event. The notification of the login event may include login information (e.g., user name) of the login user, for example.

In step S23, the login information receiving part 37 notifies the job control part 38 of the login event. In step S24, the job control part 38 designates the login user and sends a job acquisition request to the job storing part 36.

In step S25, the job storing part 36 searches the submitting user information of the print job management information illustrated in FIG. 10, for example, using the login user as key information, and acquires a job list of print jobs that have been submitted by the login user. In step S26, the job storing part 36 searches the delegated user information of the print job management information illustrated in FIG. 10, for example, using the login user as key information, and acquires a job list of print jobs that have been delegated to the login user by another user.

In step S27, the job storing part 36 transmits the job lists of the print jobs that have been submitted by the login user and the print jobs that have been delegated to the login user by another user to the job control part 38. In step S28, the job control part 38 sends a request to the job list generating part 40 to generate a job list of the login user (login user job list) based on the job lists of the print jobs that have been submitted by the login user and the print jobs that have been delegated to the login user by another user.

The job list generating part 40 generates the login user job list that includes the print jobs that have been submitted by the login user and the print jobs that have been delegated to the login user by another user. Then, in step S29, the job list generating part 40 transmits the generated login user job list to the job acquiring part 53 of the image processing apparatus 13.

The job display part 57 of the job acquiring part 53 displays the login user job list received from the output control apparatus 11. In this way, the login user may check the job list including the print jobs that have been submitted by the login user and the print jobs that have been delegated to the login user by another user at the operation panel of the image processing apparatus 13, for example.

By displaying the job list including the print jobs that have been submitted by the login user and the print jobs that have been delegated to the login user by another user at the operation panel of the image processing apparatus 13, for example, the user may check the job list, select a delegation print job delegated to the login user from the job list, and execute the selected delegation print job. When the executed print job is a delegation print job, the output control apparatus 11 implements measures to prevent the print job from being executed plural times by deleting the print job from the job storing part 36 once the print job has been executed by one of the designated delegation print executors.

<Summary>

In the system 1 according to the first embodiment, information on a delegation print executor who is allowed to execute a print job may be designated by user information as well as group information. In this way, a delegation print command may be easily generated.

For example, in the case of delegating a print job in a conventional system, information on a delegation print executor is designated by user information of one or more users. Thus, when all the delegated users are unable to execute the delegation print job for some reason, user information of another user has to be designated in order to have this other user execute the delegation print job.

In one specific scenario, an executive officer may submit a print job designating secretaries A and B as delegation print executors, but both secretaries A and B may be unavailable at the moment because they are attending another meeting, for example. In such case, the delegation print job may not be executed and a printed copy of the print job may not be immediately delivered to the executive officer. If the print job needs to be executed right away, the executive officer may have to resubmit the print job newly designating secretary C, who is present at the moment, as the delegation print executor, for example.

In contrast, in the system 1 of the first embodiment, the delegation print executor may be designated by group information such as "secretary member" so that one of the members of the secretary may execute the delegation print job and deliver the printed copy to the executive officer. By enabling designation of the delegation print executor by group information, plural users may be designated as delegation print executors at once, for example.

Second Embodiment

In the first embodiment of the present invention, information on a delegation print executor may be designated by user information as well as group information. The system 1 according a second embodiment of the present invention enables print command operations for implementing share print including delegation print. Note that features of the system 1 according to the second embodiment that may be substantially identical to the system 1 according to the first embodiment are given the same reference numerals and overlapping descriptions thereof are omitted.

<Processes>

In the following, processes of the system 1 according to the second embodiment are described.

<<Print Job Submission Process>>

Figure 12:
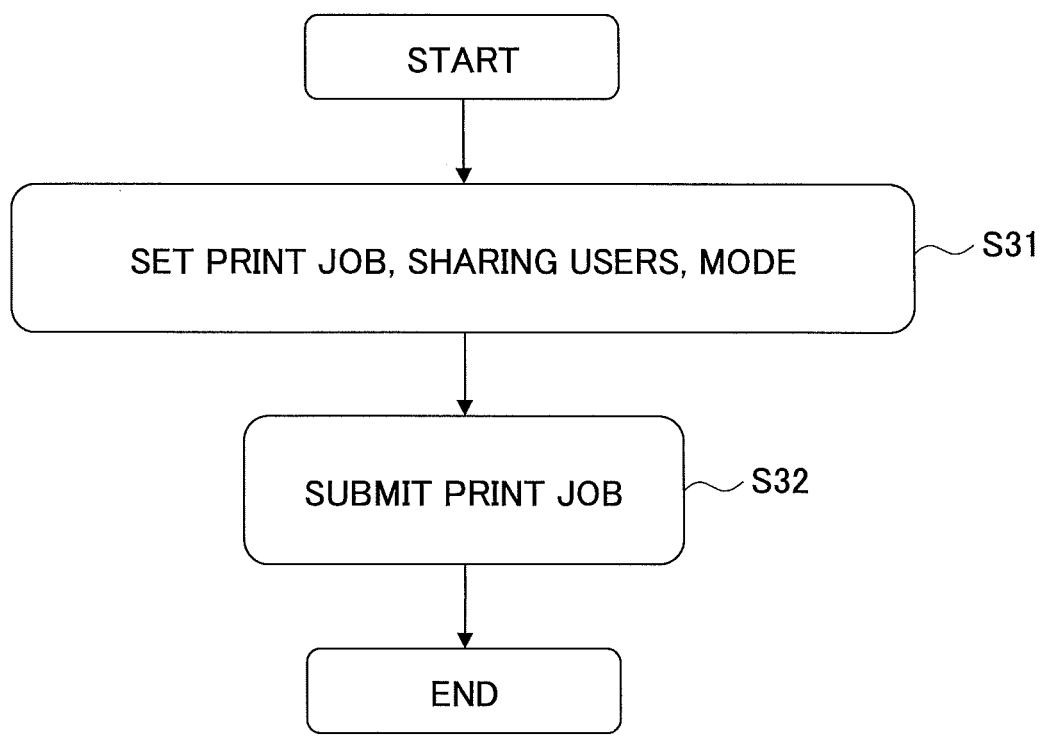
FIG. 12 is a flowchart illustrating exemplary process steps of a print job submission process according to another embodiment of the present invention.

FIG. 12 is a flowchart illustrating exemplary process steps of a print job submission process according to the present embodiment. In step S31, the user designates (sets) information on a print job, sharing users, and a mode as setting information. In the following, two modes are described as exemplary modes that may be designated. Mode 1 is for enabling all sharing users to execute a print job. Mode 1 may be designated in the case where a print job for a handout is submitted, for example. Mode 2 is for enabling one of the sharing users to execute a print job. Mode 2 may be designated in a case where the print job is a delegation print job that is to be executed on behalf of the submitting user, for example.

In step S31, the setting information of the sharing users may be designated by group information in a manner similar to the first embodiment. In step S32, the information terminal 10 submits the print job including the setting information of the sharing users and the mode designated by the user to the output control apparatus 11.

FIG. 13 is a table illustrating another exemplary configuration of print job management information for managing print jobs. The print job management information of FIG. 13 includes job name, number of pages, number of copies, storage time, print time, print completion status, sharing users, submitting user, and mode as data items.

The information on the submitting user is for identifying the user that has submitted the print job. The information on the mode is for identifying Mode 1 or Mode 2 described above. The information on the sharing users identifies all the users that are to execute the print job in the case where Mode 1 is designated, and identifies the delegation print executor as described above in connection with the first embodiment in the case where Mode 2 is designated.

The system 1 of the second embodiment may implement processes for displaying a job list and executing a print job selected from the job list that are substantially identical to those of the system 1 according to the first embodiment.

<<Print Job Deletion Process>>

Figure 14:
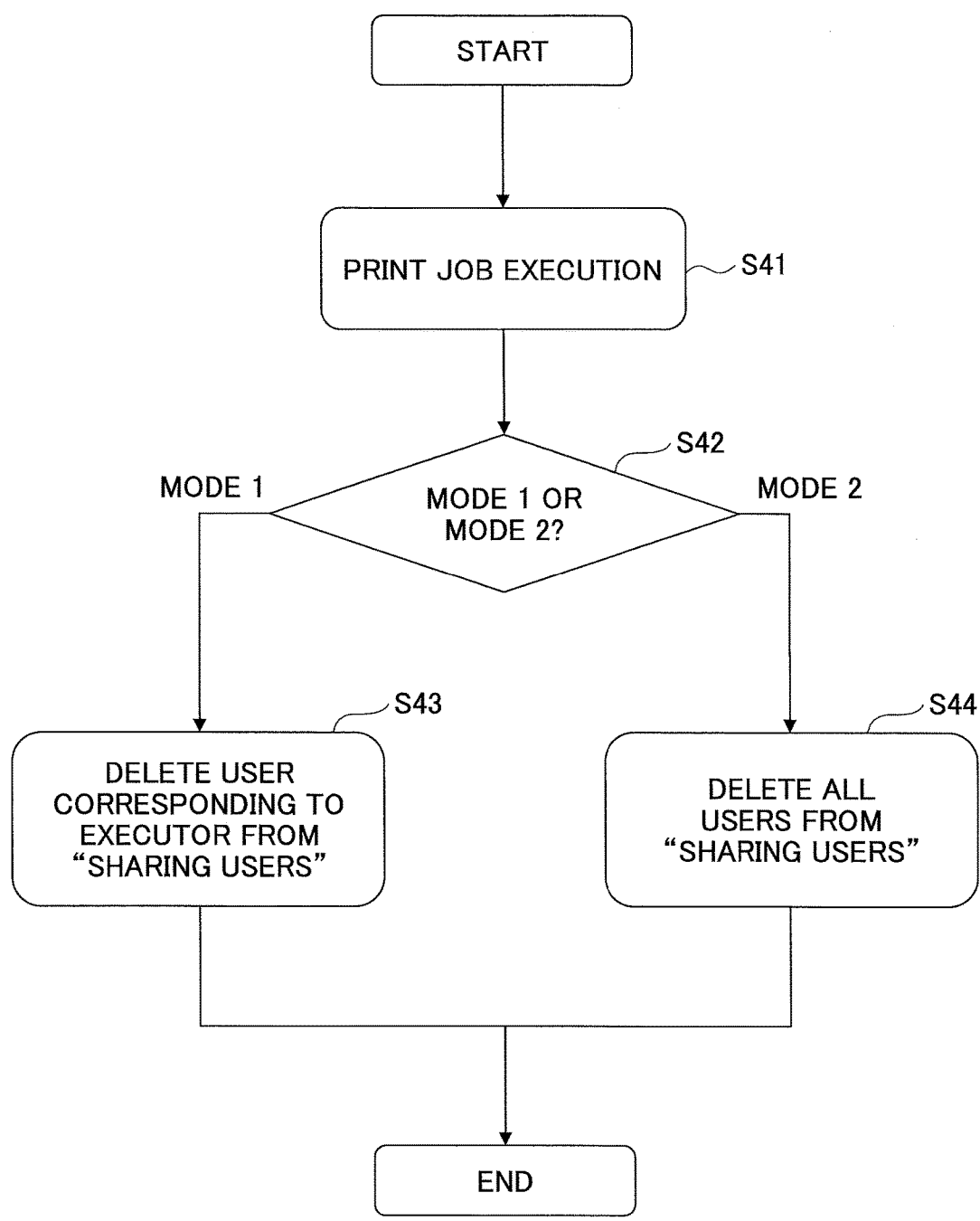
FIG. 14 is a flowchart illustrating exemplary process steps of a print job deletion process according to an embodiment of the present invention.

FIG. 14 is a flowchart illustrating exemplary process steps of a print job deletion process.

In step S41, the print control part 54 of the image processing apparatus 13 receives print data of a print job that has been selected by a user from the output control apparatus 11 and executes the selected print job. In step S42, the job control part 38 refers to the print job management information of FIG. 13 to check the mode designated for the executed print job.

If Mode 1 is designated for the executed print job, the job control part 38 proceeds to step S43 and deletes information of the user that has executed the print job from the information on the sharing users for the executed print job included in the print job management information of FIG. 13. As described above, Mode 1 is for enabling all users designated as sharing users to execute a print job. Thus, even when one of the sharing users has executed the print job, the remaining sharing users may still execute the print job.

If Mode 2 is designated for the print job, the job control part 38 proceeds to step S44 and deletes information of all users from the information on the sharing users for the executed print job included in the print job management information of FIG. 13. As described above, Mode 2 is for enabling one of the sharing users to execute a print job on behalf of another user that has delegated the print job, for example. Thus, once the print job has been executed by one of the sharing users, the other sharing users are prevented from executing the print job.

In one embodiment, in the case where Mode 2 is designated as the mode for a print job, in step S44, the job control part 38 may delete the entire record of the executed print job from the print job management information of FIG. 13.

<Summary>

In the system 1 according to the second embodiment, a desired mode for executing a print job such a mode for enabling all sharing users to execute the print job or a mode for enabling one of the sharing users to execute the print job on behalf of another user may be designated upon issuing a print command.

Third Embodiment

<System Configuration>

A system 2 according to a third embodiment of the present invention uses a public network such as a cloud environment.

Figure 15:
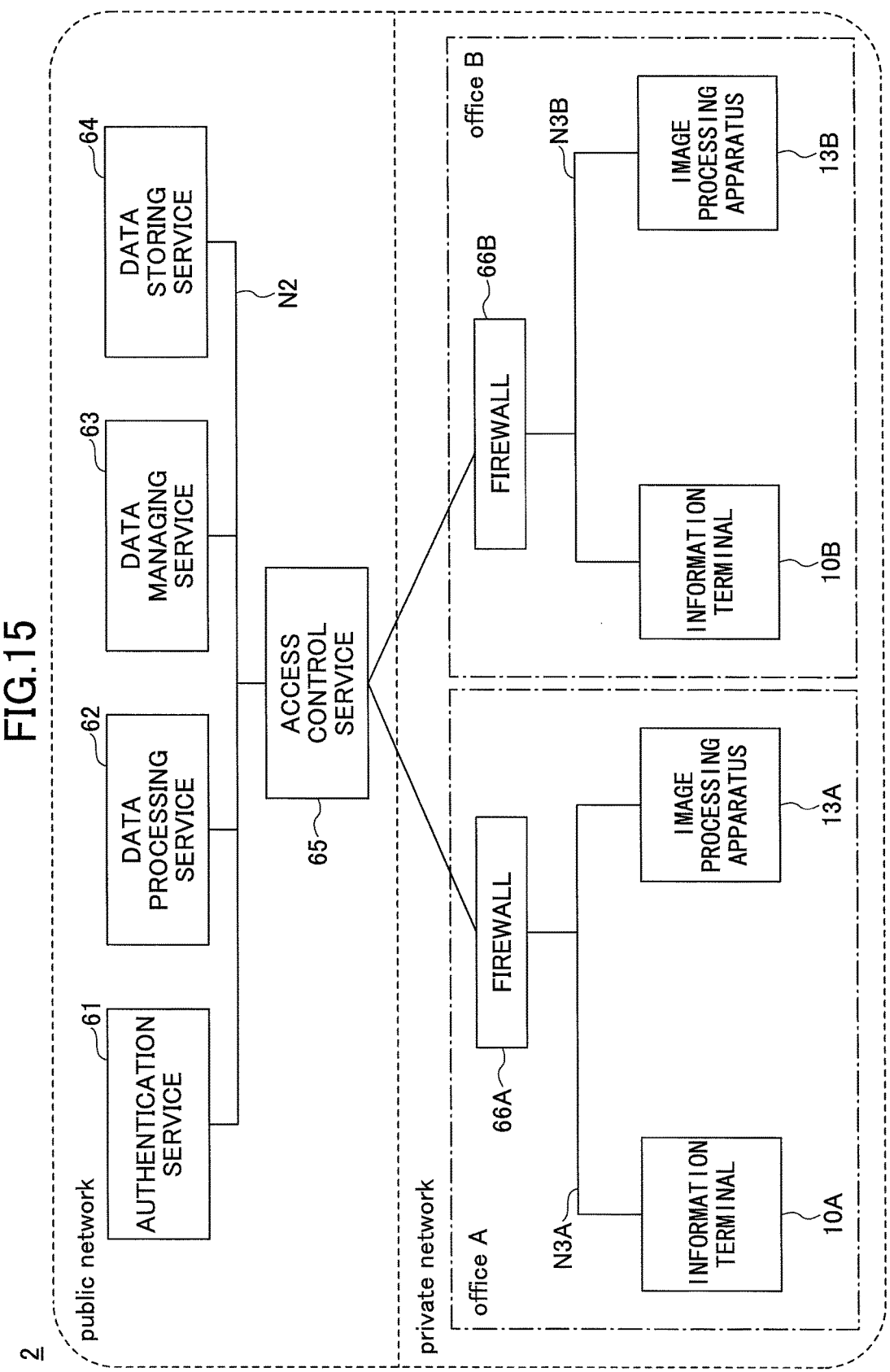
FIG. 15 illustrates an exemplary configuration of a system according to another embodiment of the present invention.

FIG. 15 illustrates an exemplary configuration of the system 2 according to the present embodiment. The system 2 of FIG. 15 includes a public network N2 and private networks N3A and N3B. The public network N2 may be a wide area network such as the Internet, for example. The private networks N3A and N3B may be local area networks (LAN) of a company or an office, for example.

In FIG. 15, an access control service 65 is configured to provide security for the public network N2. A firewall 66A is configured to provide security for the private network N3A. A firewall 66B is configured to provide security for the private network N3B.

The public network N2 and the private networks N3A and N3B are connected to each other via the access control service 65 and the firewalls 66A and 66B.

The public network N2 includes at least one computer system that provides certain features and functions by implementing a web application or a server-side application, for example. With such a computer system, an authentication service 61, a data processing service 62, a data managing service 63, and a data storing service 64 may be implemented at the public network N2, for example. The private network N3A includes an information terminal 10A and an image processing apparatus 13A. The private network N3B includes an information terminal 10B and an image processing apparatus 13B.

Note that some of the services implemented at the public network N2 in the illustrated example of FIG. 15 may alternatively be implemented at the private networks N3A and/or N3B, for example. Also, some functional features of the information terminals 10A and 10B and/or the image processing apparatuses 13A and 13B of the private networks N3A and N3B may be implemented at the public network N2, for example.

The information terminals 10A and 10B may be identical to the information terminal 10 of the first embodiment. The image processing apparatuses 13A and 13B may be identical to the image processing apparatus 13 of the first embodiment. The authentication service 61 stores management information such as user information and company/device information, performs an authentication determination process based on the management information, and provides the management information to another service, for example.

The data processing service 62 processes data submitted by a user. For example, the data processing service 62 may perform data conversion, data transmission, or data storage processes on data submitted by a user. The data managing service 63 manages data and performs processes in response to a login user request (e.g., job list transmission, job transmission, job deletion).

The data storing service 64 stores electronic data such as photograph data, image data, document data, and print data. The access control service 65 controls login access to various services including the authentication service 61, the data processing service 62, the data managing service 63, and the data storing service 64.

FIG. 16 is a table illustrating an exemplary configuration of the user information. The user information of FIG. 16 includes company information, company code, branch office name, branch office code, user name, password, address information, and group as data items. FIG. 17 is a table illustrating an exemplary configuration of the company/device information. The company/device information of FIG. 17 includes company code, branch office name, branch office code, and device information as data items.

<Processes>

<<Login Process from Information Terminal 10A>>

Figure 18:
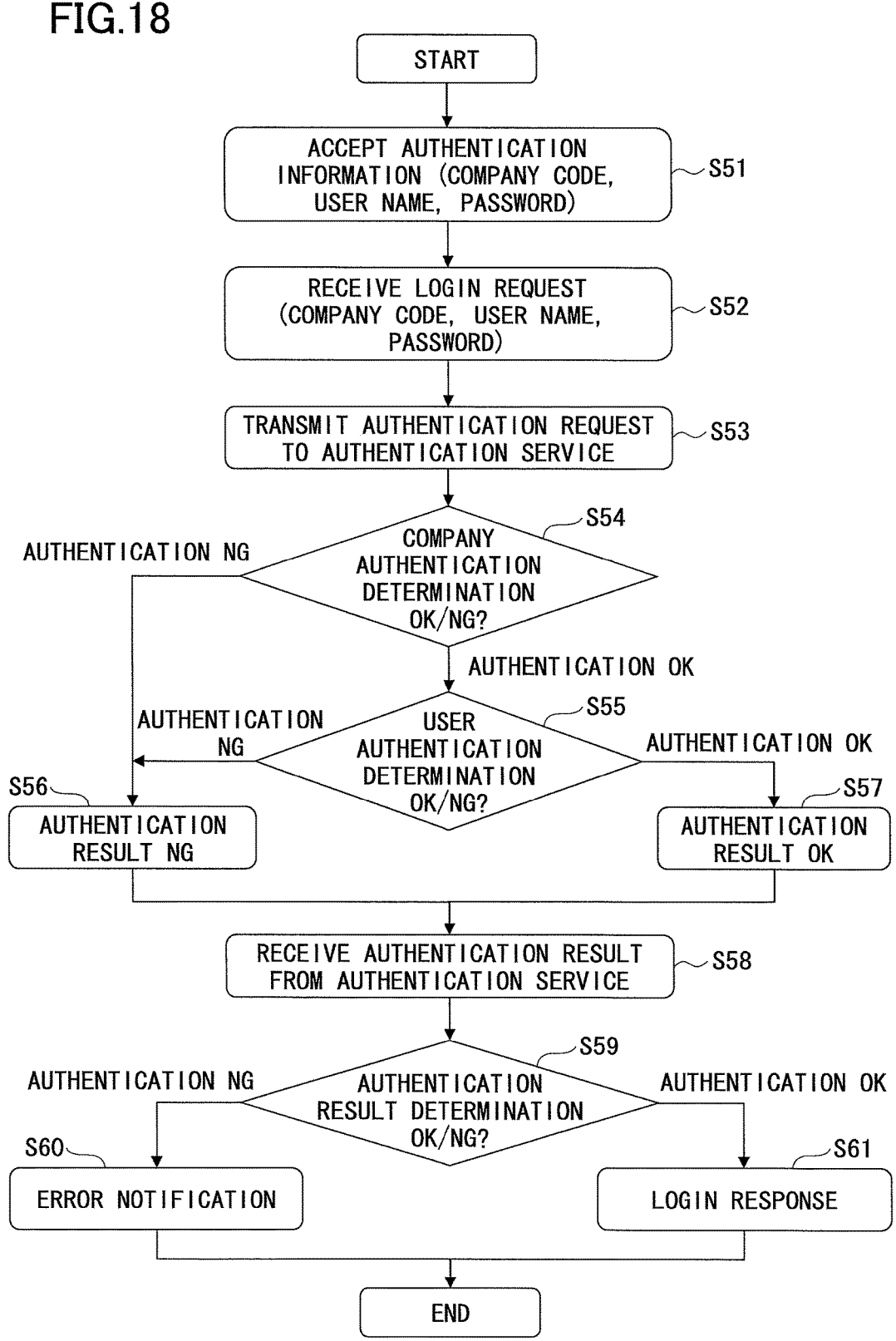
FIG. 18 is a flowchart illustrating exemplary process steps of a login process from an information terminal according to an embodiment of the present invention.

FIG. 18 is a flowchart illustrating exemplary process steps of a login process from the information terminal 10A. In step S51, the information terminal 10A accepts authentication information (e.g., company code, user name, password) input by a user. In turn, the information terminal 10A issues a login request for gaining access to the data managing service 63 based on the accepted authentication information and sends the login request to the access control service 65.

In step S52, the access control service 65 receives the login request from the information terminal 10A. In step S53, the access control service 65 sends an authentication request to the authentication service 61 by providing the authentication information included in the login request to the authentication service 61.

In step S54, the authentication service 61 performs a company authentication determination process based on the company code included in the received authentication information and the company code of the company/device information stored at the authentication service 61 as management information. If the company authentication is successful (OK), the process proceeds to step S55 where the authentication service 61 performs a user authentication determination process based on the user name and password included in the received authentication information and the user name and password of user information associated with the authenticated company code of the management information.

If the user authentication is successful (OK), the process proceeds to step S57 where the authentication service 61 sends a successful authentication result (authentication result OK) to the access control service 65. If the company authentication is not successful (NG) in step S54 or the user authentication is not successful (NG) in step S55, the authentication service 61 proceeds to step S56 to send a failed authentication result (authentication result NG) to the access control service 65.

In step S58, the access control service 65 receives the authentication result from the authentication service 61. In step S59, the access control service 65 determines the received authentication result. If the authentication result is determined to be a failure (authentication NG), the process proceeds to step S60 where the access control service 65 sends an error notification indicating that the login request is denied to the information terminal 10A corresponding to the sender of the login request. If the authentication result is determined to be successful (authentication OK), the process proceeds to step S61 where the access control service 65 sends a login response indicating the login request is accepted to the information terminal 10A.

<<Login Process from Image Processing Apparatus 13A>>

Figure 19:
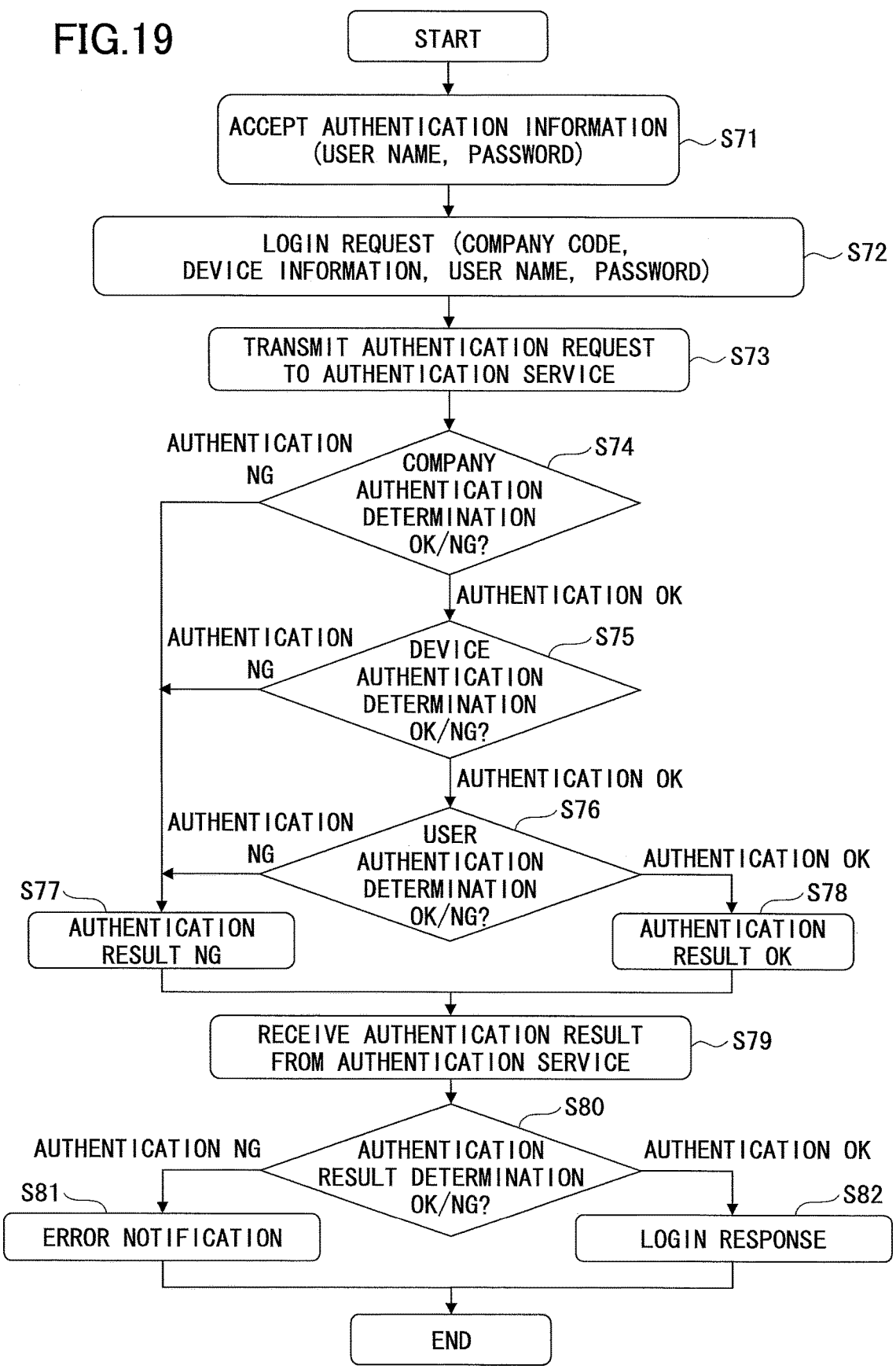
FIG. 19 is a flowchart illustrating exemplary process steps of a login process from an image processing apparatus according to an embodiment of the present invention.

FIG. 19 is a flowchart illustrating exemplary process steps of a login process from the image processing apparatus 13A.

In step S71, the image processing apparatus 13A accepts authentication information (user name, password) that is input by a user. The user may input the authentication information by operating an operation panel or prompting an IC card reader to read the authentication information from an IC card, for example. Alternatively, the user may use biological information such as a fingerprint, a voiceprint, or a vein as the authentication information.

In step S72, the image processing apparatus 13A issues a login request for gaining access to the data managing service 63 based on authentication information including the user name and password input by the user and information retained by the image processing apparatus 13A such as company code and device information (e.g., information identifying the device, or information identifying the application installed in the device), and the image processing apparatus 13A sends the login request to the access control service 65.

In step S73, the access control service 65 that receives the login request sends an authentication request to the authentication service 61 by providing the authentication information included in the received login request to the authentication service 61.

In step S74, the authentication service 61 performs a company authentication determination process based on the company code included in the received authentication information and the company code of the company/device information stored at the authentication service 61 as management information. If the company authentication is successful (OK), the process proceeds to step S75 where the authentication service 61 performs a device authentication determination process based on the device information included in the received authentication information and the device information included in the company/device information of the management information.

If the device authentication is successful (OK), the process proceeds to step S76 where the authentication service performs a user authentication determination process based on the user name and password included in the received authentication information and the user name and password of user information associated with the authenticated company code of the management information.

If the user authentication is successful (OK), the process proceeds to step S78 where the authentication service 61 sends a successful authentication result (authentication result OK) to the access control service 65. If the company authentication is not successful (NG) in step S74, the device authentication is not successful in step S75, or the user authentication is not successful (NG) in step S76, the authentication service 61 proceeds to step S77 to send a failed authentication result (authentication result NG) to the access control service 65.

In step S79, the access control service 65 receives the authentication result from the authentication service 61. In step S80, the access control service 65 determines the received authentication result. If the authentication result is determined to be a failure (authentication NG), the process proceeds to step S81 where the access control service 65 sends an error notification indicating that the login request is denied to the image processing apparatus 13A corresponding to the sender of the login request. If the authentication result is determined to be successful (authentication OK), the process proceeds to step S82 where the access control service 65 sends a login response indicating the login request is accepted to the image processing apparatus 13A.

<<Print Job Submission Process>>

In the system 2 according to the present embodiment, after the login request made by the information terminal 10A is accepted, the information terminal 10A may submit a print job to the data managing service 63. When a print job is submitted to the data managing service 63 in the system 2 of the present embodiment, processes similar to those performed by the output control apparatus 11 and the user information managing apparatus 12 of the first embodiment may be performed by the authentication service 61, the data processing service 62, the data managing service 63, and/or the data storing service 64.

For example, upon receiving a print request from the information terminal 10A, the data managing service 63 may analyze the print data included in the print request. In a case where information on a delegation print executor is represented by group information, the data managing service 63 may acquire delegated user information associated with the group information from the authentication service 61, for example. Then, the data managing service 63 may associate the print job received from the information terminal 10A with the delegated user information and store the print request with the associated information as a print job of print job management information of the data managing service 64, for example. The print job management information may be managed as a job management table as illustrated in FIG. 20, for example.

FIG. 20 illustrates an exemplary configuration of the print job management information that may be used to manage print jobs in the system 2 of the present embodiment. The system 2 of the present embodiment may also use the print job management information as illustrated in FIG. 10 or 13, for example. The print job management information of FIG. 20 is a job management table that includes company information, job ID, user name, password, sharing users, mode, and designated location as data items.

The print job management information of FIG. 20 differs from FIGS. 10 and 13 in that it includes information on a designated location for a print job. Although the meaning of the designated location may vary depending on rules that are set up within the system 2 (described below), the designated location may represent a location at which a print job may be executed by one or more sharing users or a location at which the print job may not be executed, for example.

As can be appreciated from the print job management information of FIG. 20, in the system 2 according to the present embodiment, even when information on a delegation print executor that is allowed to execute a print job is represented by group information in the print data, delegated user information associated with the group information may be acquired and managed as sharing users. Also, in the system 2 according to the present embodiment, information on a designated location is included in the print job management information so that restrictions may be imposed on the location at which a print job may be executed by the sharing users.

<<Job List Acquisition Process>>

In the system 2 according to the present embodiment, after the login request made by the image processing apparatus 13A is accepted, the image processing apparatus 13A may acquire a job list indicating print jobs of a login user. To provide the job list to the image processing apparatus 13A, the authentication service 61, the data processing service 62, the data managing service 63, and/or the data storing service 64 may perform processes similar to those performed by the output control apparatus 11 and the user information managing apparatus 12 of the first embodiment.

For example, the data managing service 63 may search the user name information of the print job management information illustrated in FIG. 20 using the login user as key information to acquire a job list of print jobs that are delegated to the login user by another user. Further, in the process of acquiring the job list of print jobs delegated to the login user by another user, if information on a designated location is associated with a print job, the data managing service 63 may exclude the print job from the job list based on rules (described below) in a case where the login user is logging in from a location at which the print job cannot be executed.

The data managing service 63 may generate a job list for the login user based on the job list of print jobs delegated to the login user by another user and print jobs submitted by the login user. Then, the data managing service 63 may transmit the generated job list for the login user to the image processing apparatus 13A. In turn, the image processing apparatus 13A receives the job list from the data managing service 63 and displays the received job list.

In this way, the login user may check the job list including the print jobs delegated to the login user by another user and the print jobs submitted by the login user at the operation panel of the image processing apparatus 13A, for example.

Thus, the login user may check the job list including the print jobs delegated to the login user by another user at the operation panel of the image processing apparatus 13A, for example, select a delegation print job from the job list, and execute the selected delegation print job. In a case where the executed print job is a delegation print job and Mode 2 is designated as the execution mode, the data managing service 63 may delete the print job from the print job management information, for example, so that the print job may be prevented from being executed again once the print job is executed by one of the delegation print executors.

<<Rules Restricting Execution Location of Print Job by Sharing Users>>

In the following, exemplary rules restricting the location at which sharing users may execute a print job are described.

Figure 21:
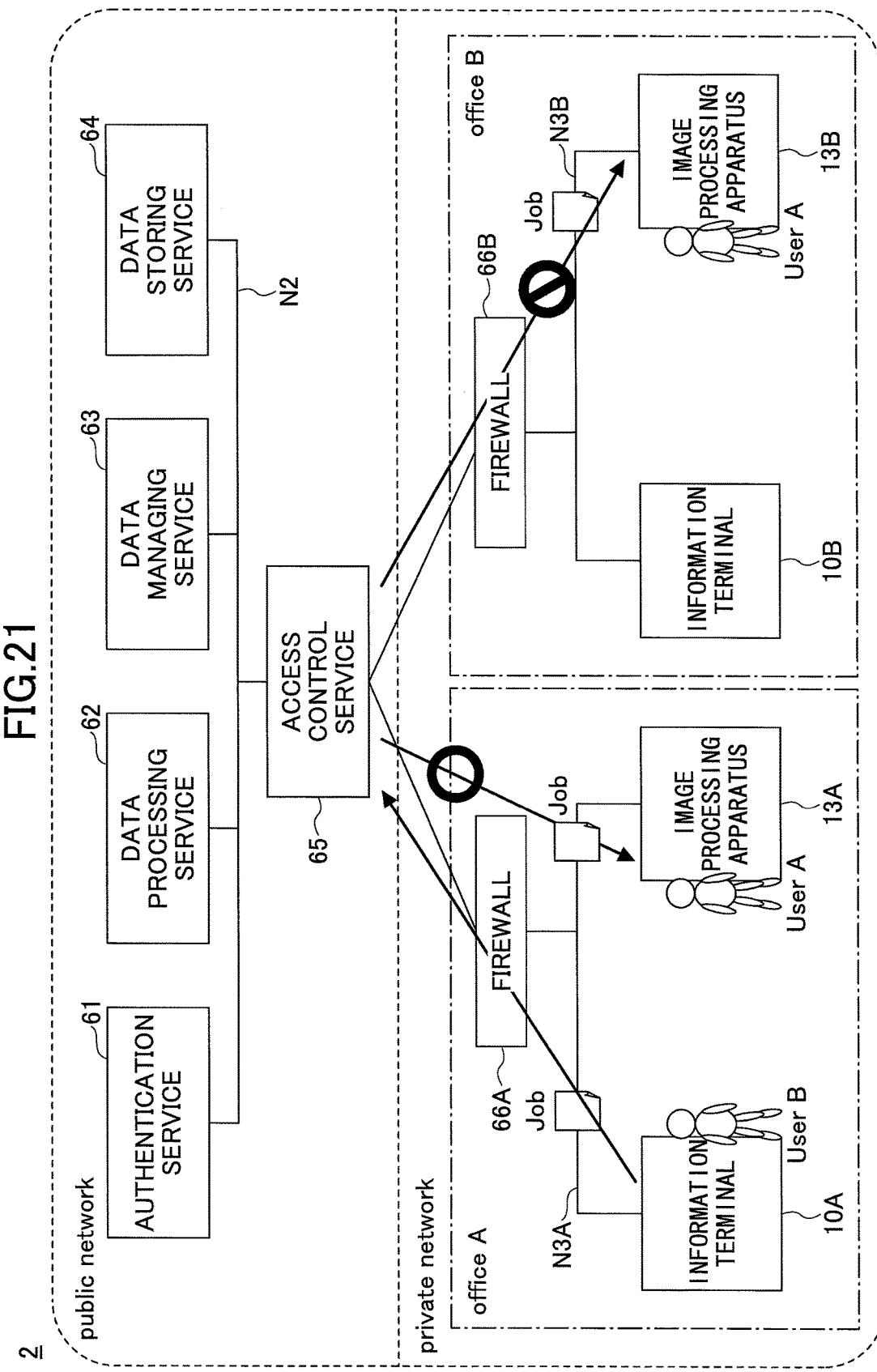
FIG. 21 illustrates an exemplary set of rules for restricting the location at which sharing users may execute a print job.

FIG. 21 illustrates one exemplary set of rules restricting the location at which sharing users may execute a print job. In the example illustrated in FIG. 21, User B submits a print job from the information terminal 10A of the private network N3A. According to the rules of the present example, User A, who is a sharing user, is allowed to execute the print job submitted by User B from the image processing apparatus 13A of office A, which is where User B is stationed. However, User A is not allowed to execute the print job from the image processing apparatus 13B of office B, which is not where User B is stationed.

That is, FIG. 21 illustrates exemplary rules prohibiting the execution of a print job at a location other than the location (office A) of the user that has submitted the print job.

Figure 22:
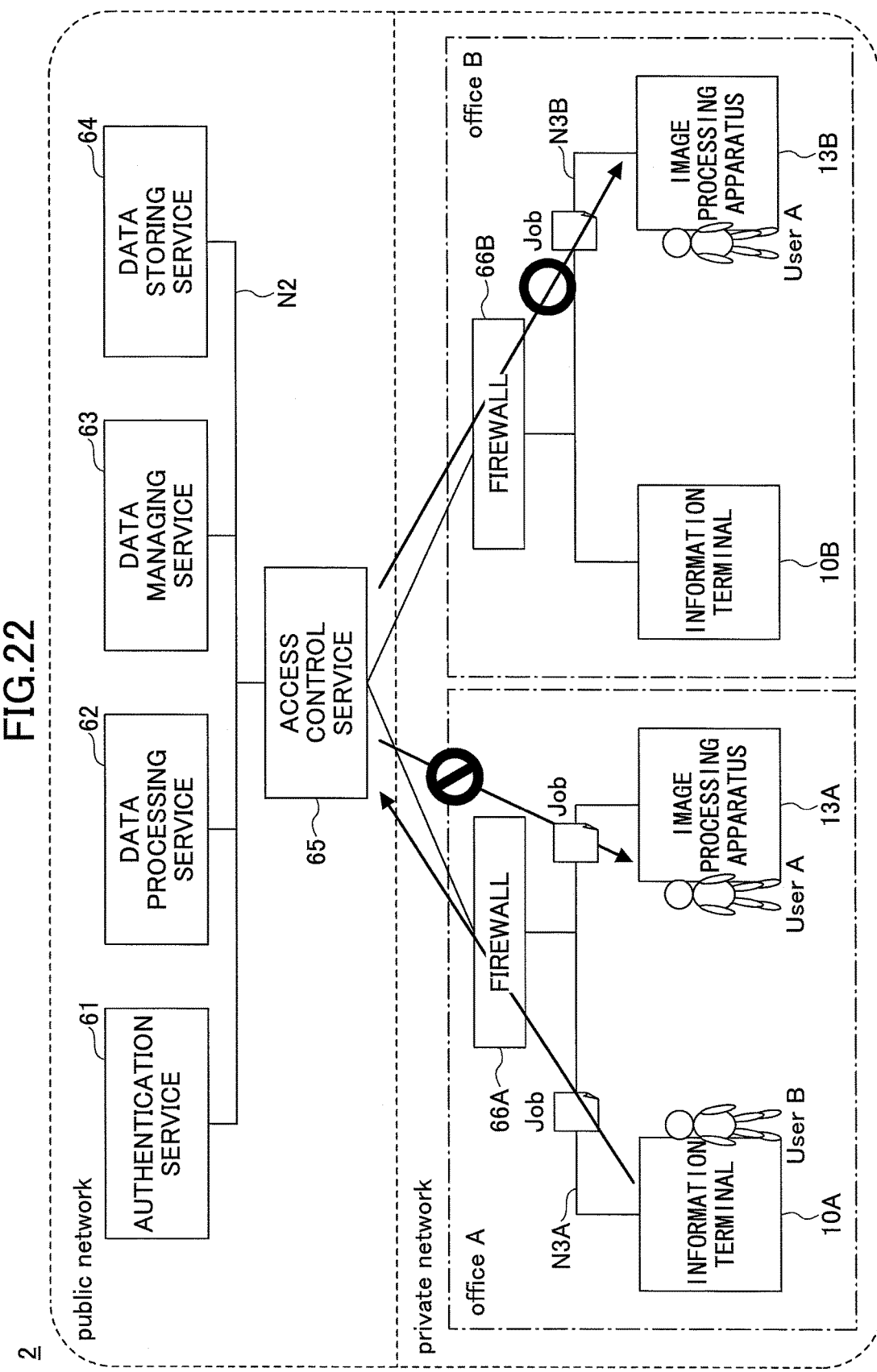
FIG. 22 illustrates another exemplary set of rules for restricting the location at which sharing users may execute a print job.

FIG. 22 illustrates another exemplary set of rules restricting the location at which a print job may be executed by sharing users. In the example illustrated in FIG. 22, User B submits a print job from the information terminal 10A of the private network N3A designating office B as the designated location.

According to the rules illustrated in FIG. 22, User A, who is a sharing user, is allowed to execute the print job from the image processing apparatus 13B of office B, which is designated by User B that has submitted the print job. However, User A is not allowed to execute the print job from the image processing apparatus 13A of office A, which is not designated by User B.

That is, FIG. 22 illustrates exemplary rules prohibiting the execution of a print job at a location other than the location (office B) designated by the user that has submitted the print job.

Figure 23:
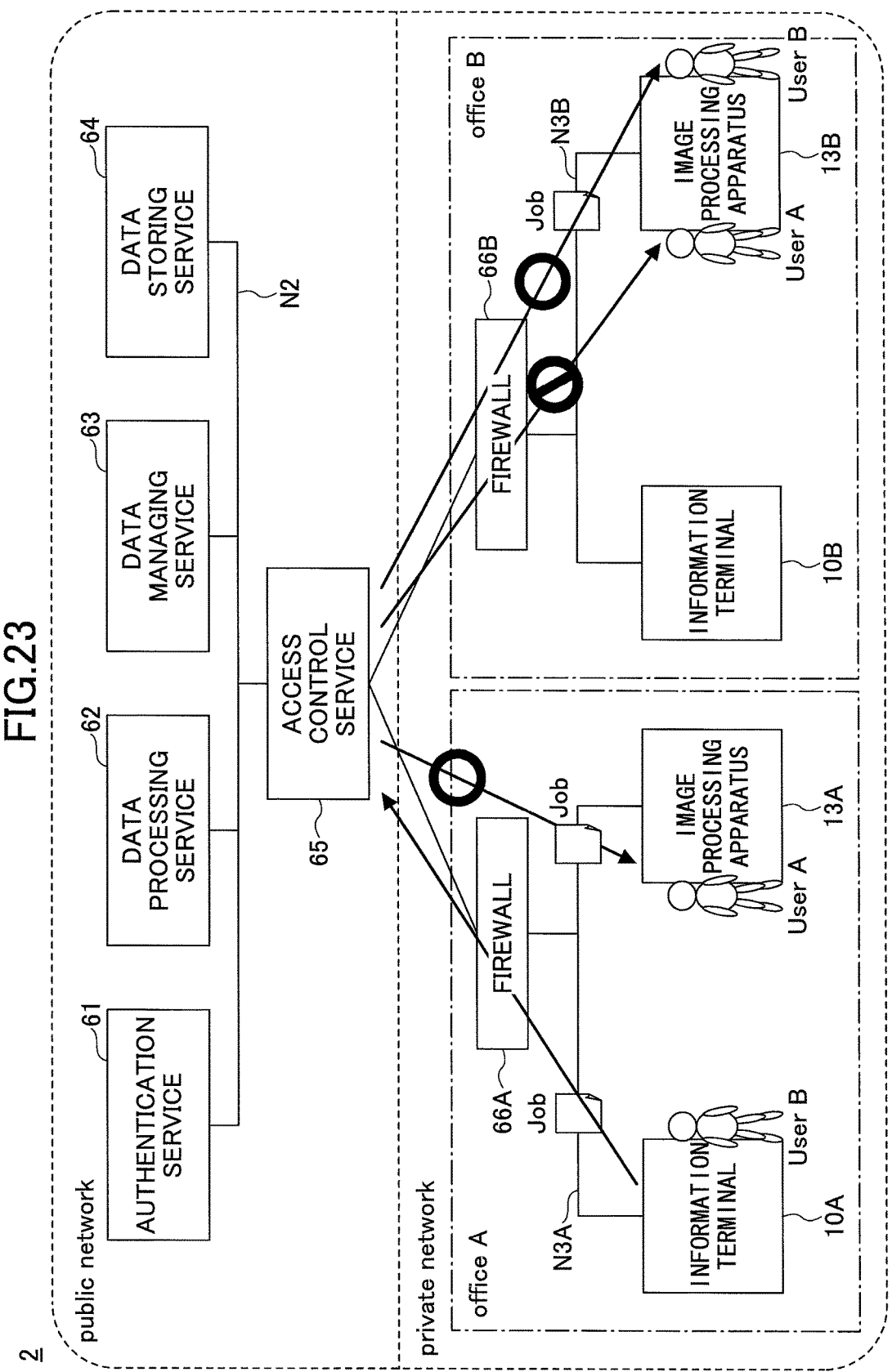
FIG. 23 illustrates another exemplary set of rules for restricting the location at which sharing users may execute a print job.

FIG. 23 illustrates another exemplary set of rules restricting the location at which a print job may be executed by sharing users.

In the example illustrated in FIG. 23, User B submits a print job from the information terminal 10A of the private network N3A. According to the rules illustrated in FIG. 23, User A, who is a sharing user, is allowed to execute the print job from the image processing apparatus 13A of office A, which is where User B that has submitted the print job is stationed. However, User A is not allowed to execute the print job from the image processing apparatus 13B of office B, which is not where User B is stationed. On the other hand, User B, who is the submitting user of the print job, is allowed to execute the print job from the image processing apparatus 13B of office B That is, FIG. 23 illustrates exemplary rules prohibiting the execution of a print job by a sharing user at a location other than the location (office A) of the user that has submitted the print job.

<<No Mode Designating Function in Cloud Environment>>

FIG. 24 illustrates exemplary measures that may be implemented in a system 3 according to an embodiment of the present invention in a case where a mode designating function is not supported in a cloud environment (public network).

In the example illustrated in FIG. 24, mode designation is enabled when using a print server 71 of the private network N3A, but mode designation is disabled when using the cloud environment. Note, however, that even though a mode designation function is not supported in the cloud environment, the cloud environment may still be used to manage information of print jobs designating Mode 1 as the execution mode.

FIG. 25 illustrates other exemplary measures that may be implemented in the system 3 in the case where a mode designation function is not supported in the cloud environment.

In FIG. 25, mode designation is enabled by a mode management application 72 that is installed in the information terminal 10A. FIG. 25 illustrates an example in which User B submits a print job from the information terminal 10A of the private network N3A and User A, who is a sharing user, executes the print job from the image processing apparatus 13B of the private network N3B.

In the example of FIG. 25, the information terminal 10A submits the print job to the cloud environment (public network N2). When User A, who is a sharing user, executes the print job from the image processing apparatus 13B of private network N3B, the information terminal 10A receives a completion notification from the cloud environment. In turn, the mode management application 72 installed in the information terminal 10A performs a job management determination process to determine whether to delete the print job based on the execution mode that is designated for the print job.

If the mode management application 72 determines that the print job should be deleted, the information terminal 10A sends a delete request to the cloud environment to have the print job deleted from the print job management information.

As can be appreciated from above, even when a mode designation function is not supported by the cloud environment, the system 3 of the present embodiment may implement the mode designation function using the mode management application 72.

<Summary>

In the systems 2 and 3 according to embodiments of the present invention, a public network such as a cloud environment may be used to implement functions and features similar to those of system 1 according to the first and second embodiments of the present invention.

Although the present invention has been described above with reference to certain preferred embodiments, the present invention is not limited to these embodiments, and numerous variations and modifications may be made without departing from the scope of the present invention.

For example, the image processing apparatus 13 described above is not limited to an apparatus having a printing function such as a printer or a MFP, but may be any type of apparatus that performs image processing based on an output job including, for example, a projecting apparatus such as a projector and a display apparatus that displays image data.

Also, in the above-described embodiments, when a print job corresponds to a delegation print job, once the print job is executed by one of the delegation print executors that are assigned to execute the print job, the print job is deleted so that the other delegation print executors would be prevented from executing the print job. However, deleting the print job is merely one exemplary measure that may be implemented to prevent plural delegation print executors from redundantly executing the delegation print job.

As another exemplary measure for preventing redundant execution of a delegation print job by plural delegation print executors, once a certain condition such as the execution of a delegation print job by one of plural delegation print executors is satisfied, a flag or some other indicator may be set up for the print job to prevent the other delegation print executors from executing the print job.

Note that the image processing apparatus 13 is an embodiment of a data output execution apparatus or a processing apparatus of the present invention. The print request receiving part 33 is an embodiment of a data receiving part and a mode information receiving part of the present invention, the job recording part is an embodiment of a data recording part of the present invention, and the job storing part 36 is an embodiment of a storage part of the present invention. The login information accepting part 37 is an embodiment of an information accepting part, and the job control part 38 is an embodiment of a first control part and a second control part of the present invention. The data managing service 63 is an embodiment of a third control part of the present invention.

Further, the present invention can be implemented in any convenient form, for example, using dedicated hardware, or a combination of dedicated hardware and software. The present invention may be implemented as computer software implemented by one or more networked processing apparatuses. The network can comprise any conventional terrestrial or wireless communications network, such as the Internet. The processing apparatuses can comprise any suitably programmed apparatuses such as a general purpose computer, personal digital assistant, and mobile phone (such as a WAP or 3G-compliant phone). Since the present invention can be implemented as software, each and every aspect of the present invention thus encompasses computer software implementable on a programmable device. The computer software can be provided to the programmable device using any non-transitory storage medium for storing processor readable code such as a floppy disk, a hard disk, a CD ROM, a magnetic tape device or a solid state memory device. The non-transitory storage medium can comprise any computer-readable medium except for a transitory, propagating signal.

The present application is based on and claims the benefit of priority of Japanese Patent Application No. 2012-186236 filed on Aug. 27, 2012, the entire contents of which are hereby incorporated by reference.

What is claimed is:

1. An apparatus, comprising:
a memory configured to store a program; and
a processor configured to execute the program,
wherein the processor executes the program to perform the steps of:
receiving a request of a delegated output mode as selected by a submitting user from a plurality of output modes and sent from an information terminal by the submitting user, wherein
the request of the delegated output mode includes output data and group information, by which the submitting user specifies a group of one or more delegated users,
the delegated output mode allows a delegated user from among the group of delegated users to output the output data a single time, and
the plurality of output modes includes an output mode in which the delegated user is not designated;
recording the received output data in association with user information, which identifies the submitting user and the delegated user specified by the group information, in a storage upon receiving the request of the delegated output mode;
receiving an output request for the recorded output data of the delegated output mode from the delegated user;
executing an output process for outputting the recorded output data of the delegated output mode request in response to the output request from the delegated user;
determining whether the recorded output data is to be output via the delegated output mode; and
executing a first control process for disabling execution of the output process for outputting the recorded output data, of the delegated output mode requested by the delegated user, that has already been output in response to the output request from any delegated user specified by the group information, based on a determination result that the recorded output data has already been output.

2. The apparatus as claimed in claim 1, wherein, in a case where the processor receives a request of a shared output mode as selected by the submitting user from among the plurality of output modes other than the delegated output mode, the request of the shared output mode including output data and the group information, the processor further performs the steps of:

executing a second control process for enabling execution of the output process for outputting the recorded output data of the shared output mode request by any delegated user specified by the group information who has not output the recorded output data of the shared output mode request even in the case where the recorded output data of the shared output mode request has already been output in response to the output request from another delegated user specified by the group information; and setting mode information to indicate that either the first control process or the second control process is to be applied;

wherein application of either the first control process or the second control process is based on the set mode information in controlling execution of the output process for outputting the recorded output data by the delegated user specified by the group information.

3. The apparatus as claimed in claim 2, wherein the processor further performs the step of:

receiving the output data and mode identification information of the output data, the mode identification information identifying one of the first control process and the second control process that is applied to the output data being designated by the submitting user.

4. The apparatus as claimed in claim 1, wherein the processor further performs the step of:

executing a third control process for controlling whether to output the recorded output data sent by the submitting user in response to the output request from the delegated user based on a location of the delegated user and a location designated by the submitting user.

5. The apparatus as claimed in claim 1, wherein the processer further performs the steps of:

communicating with an output apparatus via a network;

receiving the output request for the recorded output data that is sent from the output apparatus by the delegated user; and controlling the output process for outputting the requested output data to be executed at the output apparatus.

6. A data providing system, comprising:

at least one information processing apparatus configured to record data and provide the recorded data upon request;

an information terminal that transmits data to the at least one information processing apparatus; and a processing apparatus that executes a process on data received from the at least one information processing apparatus;

wherein the at least one information processing apparatus includes a memory configured to store a program; and a processor configured to execute the program, wherein the processor executes the program to perform the steps of:

receiving a request of a delegated output mode as selected by a submitting user from a plurality of output modes and sent from an information terminal by the submitting user, wherein the request of the delegated output mode includes output data and group information, by which the submitting user specifies a group of one or more delegated users, the delegated output mode allows a delegated user from among the group of delegated users to output the output data a single time, and the plurality of output modes includes an output mode in which the delegated user is not designated;

recording the received output data in a storage in association with user information, which identifies the submitting user and the delegated user specified by the group information, in a storage upon receiving the request of the delegated output mode;

receiving an output request for the recorded output data of the delegated output mode from the delegated user;

executing an output process for outputting the recorded output data of the delegated output mode in response to the output request from the delegated user;

determining whether the recorded output data is to be output via the delegated output mode; and executing a first control process for disabling execution of the output process for outputting the recorded output data of the delegated output mode requested by the delegated user, that has already been output in response to the output request from any delegated user specified by the group information, based on a determination result that the recorded output data has already been output.

7. The data providing system as claimed in claim 6, wherein, in a case where the processor receives a request of a shared output mode as selected by the submitting user from among the plurality of output modes other than the delegated output mode, the request of the shared output mode including output data and the group information, the processor further performs the steps of:

executing a second control process for enabling execution of the output process for outputting the recorded output data of the shared output mode request by any delegated user specified by the group information who has not output the recorded output data of the shared output mode request even in the case where the recorded output data of the shared output mode request has already been output in response to the output request from another delegated user specified by the group information; and setting mode information to indicate that either the first control process or the second control process is to be applied;

wherein application of either the first control process or the second control process is based on the set mode information in controlling execution of the output process for outputting the recorded output data by the delegated user specified by the group information.

8. The data providing system as claimed in claim 7, wherein the processor further performs the step of:

receiving the output data and mode identification information of the output data, the mode identification information identifying one of the first control process and the second control process that is applied to the output data being designated by the submitting user.

9. The data providing system as claimed in claim 6, wherein the processor further performs the step of executing a third control process for controlling whether to output the recorded output data sent by the submitting user in response to the output request from the delegated user based on a location of the delegated user and a location designated by the submitting user.

10. The data providing system as claimed in claim 6, wherein the processer further performs the steps of:
communicating with an output apparatus via a network;
receiving the output request for the recorded output data that is sent from the output apparatus by the delegated user; and
controlling the output process for outputting the requested output data to be executed at the output apparatus.

11. A non-transitory computer-readable medium having a computer program recorded thereon that is executable by a computer, the computer program when executed causing the computer to perform the steps of:
receiving a request of a delegated output mode as selected by a submitting user from a plurality of output modes and sent from an information terminal by the submitting user, wherein
the request of the delegated output mode includes output data and group information, by which the submitting user specifies a group of one or more delegated users,
the delegated output mode allows a delegated user from among the group of delegated users to output the output data a single time, and
the plurality of output modes includes an output mode in which the delegated user is not designated;
recording the received output data in association with user information, which identifies the submitting user and the delegated user specified by the group information in a storage upon receiving the request of the delegated output mode;
receiving an output request for the recorded output data of the delegated output mode from the delegated user;
executing an output process for outputting the recorded output data of the delegated output mode in response to the output request from the delegated user;
determining whether the recorded output data is to be output via the delegated output mode; and
executing a first control process for disabling execution of the output process for outputting the recorded output data, of the delegated output mode requested by the delegated user, that has already been output in response to the output request from any delegated user specified by the group information, based on a determination result that the recorded output data has already been output.

12. The non-transitory computer-readable medium as claimed in claim 11, wherein, in a case where the computer receives a request of a shared output mode as selected by the submitting user from among the plurality of output modes other than the delegated output mode, the request of the shared output mode including output data and the group information, the computer program further causes the computer to perform the steps of:
executing a second control process for enabling execution of the output process for outputting the recorded output data of the shared output mode request by any delegated user specified by the group information who has not output the recorded output data of the shared output mode request even in the case where the recorded output data of the shared output mode request has already been output in response to the output request from another delegated user specified by the group information; and
setting mode information to indicate that either the first control process or the second control process is to be applied;
wherein application of either the first control process or the second control process is based on the set mode information in controlling execution of the output process for outputting the recorded output data by the delegated user specified by the group information.

13. The non-transitory computer-readable medium as claimed in claim 12, wherein the computer program further causes the computer to perform the step of:
receiving the output data and mode identification information of the output data, the mode identification information identifying one of the first control process and the second control process that is applied to the output data being designated by the submitting user.

14. The non-transitory computer-readable medium as claimed in claim 11, wherein the computer program further causes the computer to perform the step of:
executing a third control process for controlling whether to output the recorded output data sent by the submitting user in response to the output request from the delegated user based on a location of the delegated user and a location designated by the submitting user.

15. The non-transitory computer-readable medium as claimed in claim 11, wherein the computer program further causes the computer to perform the steps of:
communicating with an output apparatus via a network;
receiving the output request for the recorded output data that is sent from the output apparatus by the delegated user; and
controlling the output process for outputting the requested output data to be executed at the output apparatus.

* * * * *